(12) United States Patent
Jaunk et al.

(10) Patent No.: US 11,841,881 B2
(45) Date of Patent: Dec. 12, 2023

(54) QUERYING FOR CUSTOM DATA OBJECTS

(71) Applicant: salesforce.com, inc., San Francisco, CA (US)

(72) Inventors: Naveen Singh Jaunk, Lafayette, CA (US); Sahil Bhutani, Alameda, CA (US); Palaniappa Manivasagam Ramanathan, Bangalore (IN); Adithya Nittor Vishwanath, Bangalore (IN); Raveendrnathan Loganathan, Sammamish, WA (US)

(73) Assignee: Salesforce, Inc., San Diego, CA (US)

( * ) Notice: Subject to any disclaimer, the term of this patent is extended or adjusted under 35 U.S.C. 154(b) by 0 days.

(21) Appl. No.: 17/163,032

(22) Filed: Jan. 29, 2021

(65) Prior Publication Data

US 2022/0129435 A1 Apr. 28, 2022

(30) Foreign Application Priority Data

Oct. 26, 2020 (IN) .............................. 202041046518

(51) Int. Cl.
| | | |
|---|---|---|
| *G06F 16/2455* | (2019.01) | |
| *G06F 16/22* | (2019.01) | |
| *G06F 16/242* | (2019.01) | |
| *G06F 16/25* | (2019.01) | |
| *G06F 16/28* | (2019.01) | |
| *G06F 16/2453* | (2019.01) | |
| *G06F 16/248* | (2019.01) | |

(52) U.S. Cl.
CPC ........ *G06F 16/288* (2019.01); *G06F 16/2282* (2019.01); *G06F 16/248* (2019.01); *G06F 16/2423* (2019.01); *G06F 16/24549* (2019.01); *G06F 16/24553* (2019.01); *G06F 16/254* (2019.01)

(58) Field of Classification Search
CPC ............. G06F 16/2282; G06F 16/2423; G06F 16/24549; G06F 16/254
See application file for complete search history.

(56) References Cited

U.S. PATENT DOCUMENTS

| | | | | |
|---|---|---|---|---|
| 5,778,373 | A * | 7/1998 | Levy ................... | G06F 16/258 707/999.102 |
| 8,121,978 | B2 * | 2/2012 | Wiss ................... | G06F 11/2071 707/634 |
| 2008/0256166 | A1* | 10/2008 | Branson .............. | H04L 12/4633 709/201 |
| 2011/0010379 | A1* | 1/2011 | Gilderman ............ | G06F 16/252 707/769 |

(Continued)

*Primary Examiner* — Charles D Adams
(74) *Attorney, Agent, or Firm* — Holland & Hart LLP

(57) ABSTRACT

A relational database system may receive from a client a query that is supported by the relational database system, the relational database system being configured to store a plurality of data objects such that each data object is associated with a respective data table of a plurality of data tables. The system may determine that the query is indicative of a data object type that is associated with data stored in a data system separate from the relational database system. The system may identify a schema of the data object type using a schema record maintained by the relational database system, transmit to the separate data system a request for data associated with the query, receive requested data, and return a query response including the requested data.

20 Claims, 14 Drawing Sheets

(56) References Cited

U.S. PATENT DOCUMENTS

2020/0311063 A1* 10/2020 Hariharasubrahmanian ................
                                                G06F 16/24573
2021/0377252 A1* 12/2021 Monro .................. H04L 63/102

* cited by examiner

QUERYING FOR CUSTOM DATA OBJECTS

CROSS-REFERENCE

The present Application for Patent claims priority to Indian Provisional Patent Application No. 202041046518 by Jaunk et al., entitled "CUSTOM OBJECT CONFIGURATION," filed Oct. 26, 2020, which is assigned to the assignee hereof and is expressly incorporated by reference in its entirety. The present application is related to copending U.S. application Ser. No. 17/163,000 by Jaunk et al., entitled "QUERYING FOR CUSTOM DATA OBJECTS" filed on Jan. 29, 2021, as the present application, and which is also expressly incorporated by reference in its entirety.

FIELD OF TECHNOLOGY

The present disclosure relates generally to database systems and data processing, and more specifically to querying for custom data objects.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may run on a relational database, and data within the relational database may be configured in tables with schemas or metadata structures (e.g., referred to as objects). Objects may be referenced with an identifier. However, there may be limits on the number of objects that can be stored within a relational database due to limits on the size of the identifier. Further, the relational database may have limits on the number of records that each object can store. For example, if an object exceeds a threshold number of records, the relational database may experience latency or other computational problems.

DETAILED DESCRIPTION

Figure 1:
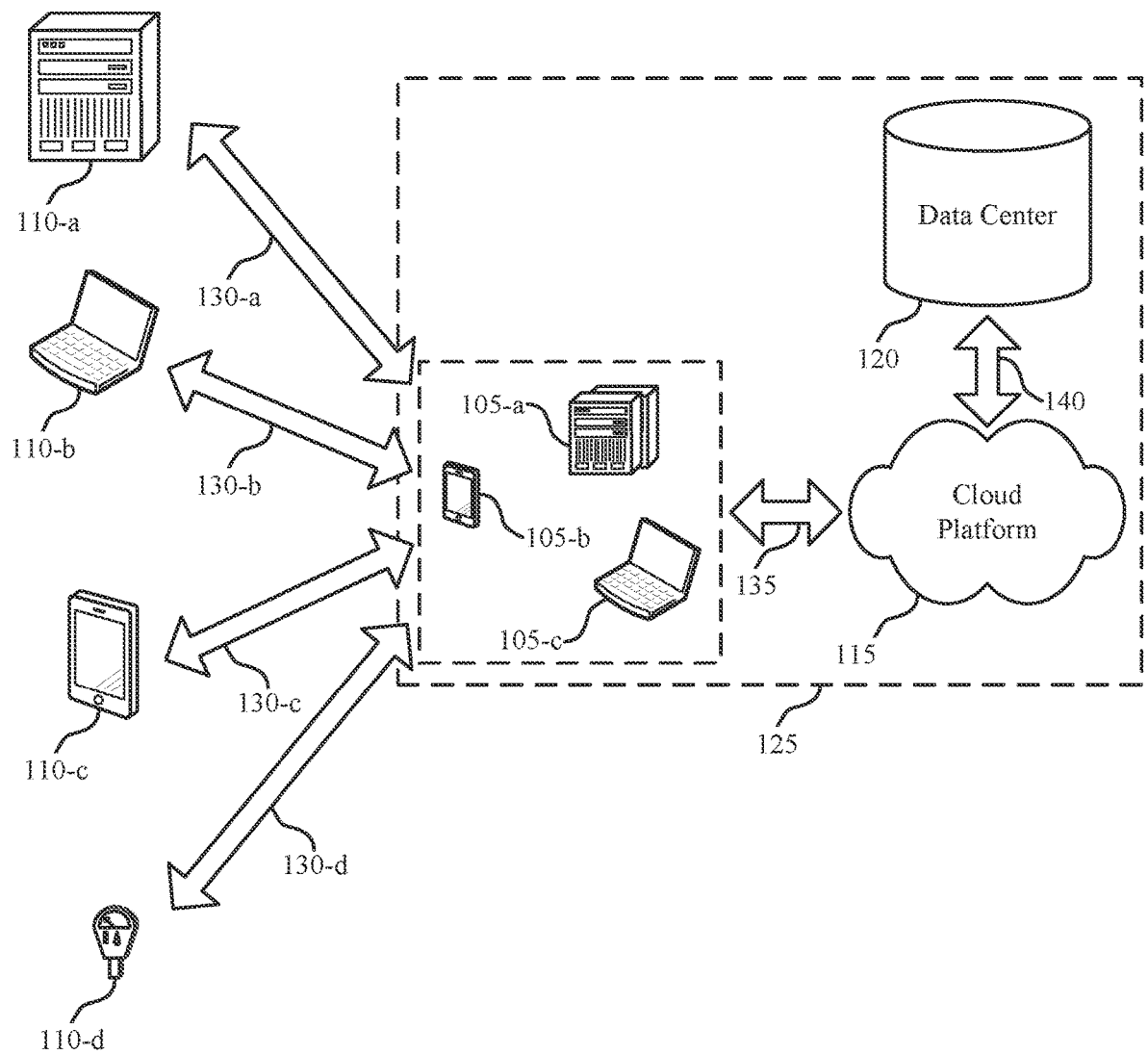
FIG. 1 illustrates an example of a data processing system that supports querying for custom data objects in accordance with aspects of the present disclosure.

A cloud platform (e.g., a multi-tenant cloud platform) may provide data processing and analytics solutions within a relational database (e.g., referred to as a Core platform). In the cloud platform, data may presented or structured as an object (e.g., a data table schema or metadata structure). Objects may be queried by various services and clients supported by the cloud platform. An object within the relational database may be associated with a three character key prefix of an object identifier field. The number of characters for the key prefix may be preset, configured, or static such that it is limited for the relational database. Functions within the cloud platform may be driven via the key prefix. For example, the data tables within the relational database may be referenced or queryable by the key prefix, or other relationships or operations within the relational database and any platforms or applications running on or supported by the relational database may be based on the key prefix. Each key prefix may be mapped to a unique data table corresponding to an object. The limitation of the three character key prefix may result in an upper limit of objects or data tables that may be supported by the relational database system. In one example, the number of objects that can be created with a three character key prefix is approximately 238,000. However, in some cases (e.g., some applications such as a customer data platform (CDP), a service or combination of services may require 100,000s of the tables to provide some functionality (e.g., B2C scale) that may not be accomplished using preconfigured limitations of a relational database system.

Another limitation with respect to relational databases is related to the number of records that each data object or data table can store. For example, as discussed above, in a cloud platform data may be presented as an object, and it may come from or be stored in a first party data center (e.g., a relational database). In some configurations, all the data associated with the objects may be stored in one single database (e.g., a relational database). The data may be exposed via simple object access protocol (SOAP) or representational state transfer (REST) API endpoints. When the data grows overtime, the clients querying or analyzing the data and the APIs may experience increased latency because of the data scale limitations on such relational databases. For example, a relational database may be limited when the data grows more than one billion rows. This limitation makes a cloud platform unsuitable for some applications (e.g., B2C scale) where data can include trillions of rows and petabytes of data. Additionally, the compute on the monolith (e.g., core platform) is limited, and it may perform heavy data ingestion and processing in addition to serving data to client systems.

Heavy compute due to ingestion and processing may result in slowed querying and impact client side applications supported by the relational database or cloud platform. In some cases, the heavy compute and querying may result in database downtime.

In accordance with aspects of the present disclosure, to solve the limitation on the number of metadata structures or objects that can be defined for a relational database, a value of a key prefix may be associated with multiple data objects of a first type. The relational database system may also support data objects of the second type (e.g., legacy data objects) that each are associated with respective key prefix values. The relational database system may receive a query that indicates a data object of the first type and identify a result of the query based on entity information (e.g., an application programming interface (API) name or developer name) corresponding to the query. Thus, the relational database system may use the entity information to differentiate between data objects of the first type that are associated with the same key prefix value. By associating multiple data objects with the same key prefix value, the number of objects supported by the relational database system may exceed the upper limit. In some cases, these data objects of the first type are stored and managed by a separate data system that is accessible by the relational database system.

In accordance with aspects of the present disclosure, to solve the limitation on the number of rows or records that can be stored for each data table (or in total) within a relational database, the data may be stored in a separate data store different from the relational database, but the data tables or metadata structures (e.g., the objects) may be managed in the relational database. A data stream may be configured to support data ingestion and processing at the secondary, separate data system. As described above, different data objects of the first type may be associated with the same key prefix value. These different data objects of the first type may be stored in the separate data system. However, the queries for the data objects of the second type (stored in the relational database system) and the data objects of the first type (stored in the separate data system) may be received at and handled by the relational database system. More particularly, the queries for both types of data objects may utilize the same syntax. However, the relational database system may be configured to identify when the query is requesting an object in the separate data system and perform various operations to retrieve the data. Further, since these objects may be associated with the same key prefix value, the relational database system may be able to process and serve the data. Thus, the amount of objects and the amount of data supportable by the relational database system is increased without significant reconfiguration of the relational database system.

Aspects of the disclosure are initially described in the context of an environment supporting an on-demand database service. Aspects of the disclosure are further described with respect to systems that support a relational database system that receives and routes queries to a separate data storage system, system architectures that support query routing and data stream configuration, and a process flow diagram illustrating querying routing to a separate system. Aspects of the disclosure are further illustrated by and described with reference to apparatus diagrams, system diagrams, and flowcharts that relate to querying for custom data objects.

FIG. 1 illustrates an example of a system 100 for cloud computing that supports querying for custom data objects in accordance with various aspects of the present disclosure.

The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The data center 120 may use a relational database system to support various services supported by the cloud platform. For example, the relational database system may store data associated with cloud clients 105 and their customers (e.g., contacts 110). The data may include customer data, product data, purchase data, web browsing data, employee data, etc. The data may be accessible via various clients such as web browsers, web applications, websites, etc.

Some systems may implement relational database systems may support a plurality of data objects, where each object is associated with a data table, and each row of the table corresponds to an instance of the object. The data may be exposed to client systems (e.g., applications, services, etc.) via SOAP API endpoints or REST API endpoints. Further the data may be ingested from various sources. As the amount of data grows, the amount of queries that the relational database system is handling increases, and the amount of data that is being ingested and processed increases, the clients querying the data may experience increased latency due to the data scale limitations, processing limitations, etc. of the relational database. These limitations may result in the relational database being unusable for some applications, such as B2C services. Additionally, the heavy compute load on the monolith (e.g., relational database system and associated services, which may be referred to as a core platform) may result in slowed services.

Aspects of the present disclosure solve these problems by increasing the amount of data that is accessible at the relational database by using a separate data storage system from the relational database in offloading some of the data ingestion and processing compute to the separate data store. The separate data storage system may be a part of the data center 120 or may be a third party data storage solution, such as an AMAZON® S3 bucket. The data may still be queried at the relational database, meaning that the clients may not be reconfigured to interact with the separate data store. In order to support the utilization of a separate data store for the relational databases system, the relational database system may maintain a schema for those data tables and objects that are stored in the separate system. Further, the relational database system of the data center 120 may identify when a query is indicative of an object in the separate data storage system. Thus, upon identification of such a query, the relational database system may use the schema to determine the configuration of the object at the external system in order to transmit a request for the data (e.g., an API request). Further, in order to offload some of processing and compute of the data of the separate system, the relational database may be used to configure a data stream process that ingests and processes the data. Thus, using these techniques, the amount of data that is supported by the relational database system may be increased and the processing overhead associated with the data may be reduced, thereby reducing latency and increasing usability of the relational database system by client systems.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
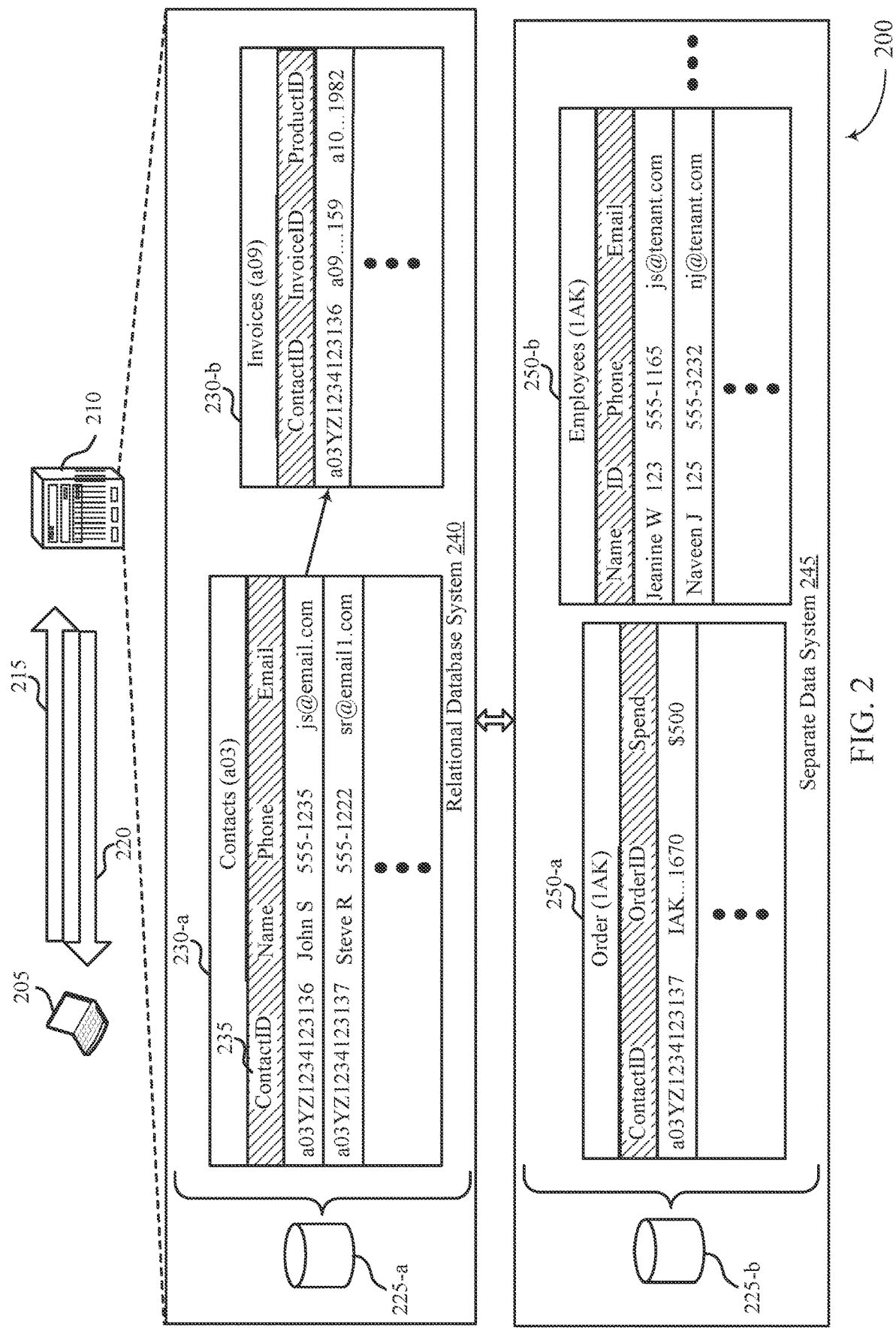
FIG. 2 illustrates an example of a system that supports querying for custom data objects in accordance with aspects of the present disclosure.

FIG. 2 illustrates an example of a system 200 that supports querying for custom data objects in accordance with aspects of the present disclosure. The system 200 includes a client 205 and a data server 210. The client 205 may represent one or more clients, services, applications, etc. that may transmit queries 215 to the data server and receive results 220 from the data server 210. For example, the client 205 may represent services, websites, applications, etc. that are supported by a cloud client 105 of FIG. 1. The client 205 may be supported or used by one or more tenants of a multi-tenant system. The client 205 may be a client that is used by employees of a tenant or by customers or contacts (e.g., contacts 110 of FIG. 1) of the tenant. The data server 210 may represent aspects of the cloud platform 115 or data center 120 of FIG. 1. The data server 210 may support various services, applications, clients (e.g., client 205) of one or more multiple tenants of a multi-tenants system.

The data server 210 may support or access a relational database system 240 for executing queries 215 and returning results 220. The relational database system 240 may include multiple data storage units 225, which may represent various types of memory and storage. The relational database system 240 includes a plurality of data tables 230. Each data table 230 may represent a data object. For example, data table 230-a represents a contact object and each row of the data table 230-a includes data that corresponds to an instance of the contact object. The objects and data tables 230 of the relational database system 240 may be related based on the utilization of identifiers or relational operators, such as object identifier fields (e.g., ContactID InvoiceID, ProductID). The objects and tables may be related in the relational database system 240 using various relationship types, such as one-to-may, one-to-one, many-to-one, etc. Each instance of an object may be referenced using an object identifier field, which may be included as a column in each data table 230. For example, data table 230-a includes object identifier field 235 (e.g., ContactID). Other data tables 230 may include the object identifier field. For example, data table 230-b includes object identifier field InvoiceID. The object identifier fields corresponding to various objects and data tables 230 may be used by the relational database system 240 to support various functionality, such as data processing, querying, etc.

The relational database system 240, in conjunction with other systems are services, may referred to as a core system in which many clients 205 interact in order to support various services. The relational database system 240 may ingest and process data from other sources. For example, data corresponding to customers or contacts of a tenant may be ingested via a data stream or other type of channel in order to update the data within the relational database system 240. The data ingestion and updating process may utilize significant processing resources. Additionally, as the amount of data, objects, and tables 230 managed by the relational database system 240 increases over time, the data ingestion and processing overhead increases. The increase in processing overhead may result in increased latency for the clients (e.g., client 205) that are querying for the data via APIs. In some cases, this increased latency may not be suitable for some scenarios or clients, such as B2C services.

In order to reduce the processing overhead at the core system (e.g., the relational database system 240) without reconfiguring the various clients 205 that interact with the core system, the implementations described herein leverage an off-core service (e.g., a separate data system 245). The separate data system 245 may be an example of a data lake or other high volume data storage solution. The relational database system 240 may maintain a mapping of entity information in order to retrieve data that is stored in the separate data system 245. Thus, when a new object is created, the user or developer may indicate that the object is to be created in the off-core system in order to take advantage of the high data storage capacity. The relational database system 240 may trigger creation of a table in the separate data system 245 that corresponds to the new custom object. Thus, as illustrated in FIG. 2, the order object corresponding to table 250-a and the employee object corresponding to table 250-b may be custom objects created by a user or developer. The relational database system 240 may trigger creation of the tables 250-a and 250-b for the custom objects. In some cases, the new objects may be associated with a data stream process that supports data ingestion into the separate data system 245 (e.g., to populate the tables 250-a and 250-b) such that the data is available to the core ecosystem. The data of the separate data system 245 may be exposed to the relational database system 240 via an object query language, such as salesforce object query language (SOQL) or SOAP APIs.

Figure 3:
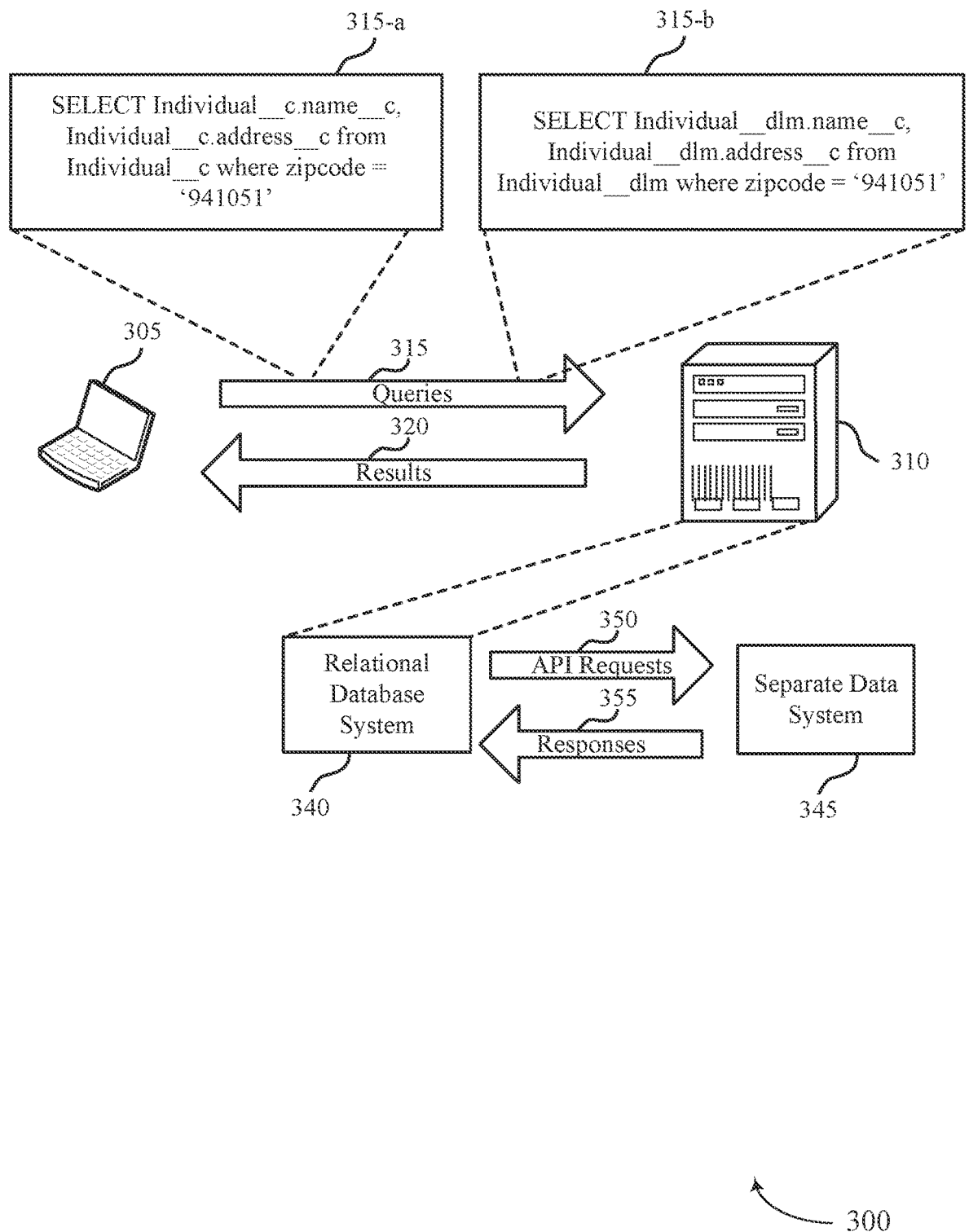
FIG. 3 illustrates an example of a system that supports querying for custom data objects in accordance with aspects of the present disclosure.

Thus, as described further with respect to FIG. 3, the relational database system 240 may identify when a query 215 specifies a data object that is stored at the separate data system 245. In such cases, the relational database system generate and transmit an API request to the separate data system 245 in order to retrieve the data. The API request may be generated based on information in the query and entity information that is maintained by the relational database system 240. For example, the relational database system 240 may identify a schema for the specified data object and generate the API request based on the schema. Accordingly, the relational database system 240 may store metadata (e.g., a schema) about the data that is stored at the separate data system 245 in order to serve such data to the clients 205 via query results 220.

In some cases, a same key prefix value for an object identifier field may be associated with multiple data objects and data tables of the separate data system 245. Further, the relational database system 240 may use various techniques to differentiate between the data objects that are associated with the same key prefix value. As illustrated, the data table 250-a and the data table 250-b are associated with same key prefix value "1AK." Thus, each instance of an object in table 250-a and 250-b may have an object identifier field that starts with "IAK." Thus, by associating multiple data objects with the same key prefix value and use the other techniques described herein, the number of data objects and data tables 230 supported by the relational database system 240 may be increased. The data tables 250-a and 250-b may correspond to examples of custom objects that are configured by a particular tenant of a multi-tenant system.

FIG. 3 illustrates an example of a system 300 that supports querying for custom data objects in accordance with aspects of the present disclosure. The system 300 includes a client 305 and a data server 310, which may be examples of the client 205 and the data server 210 of FIG. 2. The client 305 may transmit various queries 315 to the data server 310, and the data server 310 may return results 320 corresponding to the queries 315. The data server 310 may support a relational database system 340 (e.g., a core or monolith system), which may be an example of the relational database system 240 of FIG. 2. The relational database system 340 may include multiple data tables, each corresponding to a different data object. The data objects may be referenced by an object identifier field with a key prefix. Within the relational database system 340, each data object may be associated with a separate key prefix value for data processing and retrieval. Custom objects may be configured such that multiple different objects may be associated with the same key prefix values. In some examples, these different objects that share the same key prefix value may be stored in a separate data system 345, which may be an example of a data lake or another type of data system that is capable of supporting large amounts of data, such as to increase the amount of data that may be accessed by core services or client 305.

In some examples, creating a custom object creates a table (e.g., a data table schema or metadata structure) in the off-core data lake (e.g., the separate data system 345), and metadata corresponding to the custom object in the relational database system 340. The data may be exposed via not only SQL (NoSQL) or SOAP APIs or any similar query language or APIs. From the perspective of the client 305, the queries 315 for objects within the relational database system 340 may have the same syntax as the queries for the objects in the separate data system 345. In order to differentiate between the data objects of the separate data system 345, the relational database system 340 may maintain metadata or a data schema for the objects of the separate data system 345. As such, the relational database system 340 may receive the queries 315, determine that the queried for objects are objects that share the same key prefix value, and use the metadata to configure an API request 350 in order to retrieve the correct data of the separate data system 345 in API response 355.

In query 315-a, the query is request data corresponding to a standard object (e.g., Individual), which includes the "_c" suffix. The relational database system 340 may determine that the requested data corresponds to an object stored in the relational database system 340 based on the "_c" suffix, and returns the query results 320 including the requested data from the relational database system 340. In the case of query 315-b, the relational database system 340 may determine that the requested data corresponds to an object from the separate data system 345 based on the "_dll" suffix. As such, the relational database system 340 may transmit an API request 350 to the separate data system 345. The API request 350 may be generated based on the API name (e.g., Individual_dll) included in the query. Thus, upon identifying the suffix that indicates that the data corresponds to one of the custom objects, the relational database system 340 may identify entity information that is stored in the relational database system based on the API name (e.g., Individual) included in the query 315-b to generate the API request 350. The entity information may include information about the shared key prefix and information about how the data is stored in the separate data system 345 such that the data may be retrieved from the separate data system 345 using the API request 350. The query 315-a and 315-b use the same syntax, even though the data is in different locations. Thus, the techniques described herein support leveraging an additional data store without having to reconfigure clients (e.g., client 305) for interacting with the separate data system 345. Further, the use of the shared key prefix for these objects supports the relational database system 340 in identifying the objects in the separate data system 345.

Figure 4A:
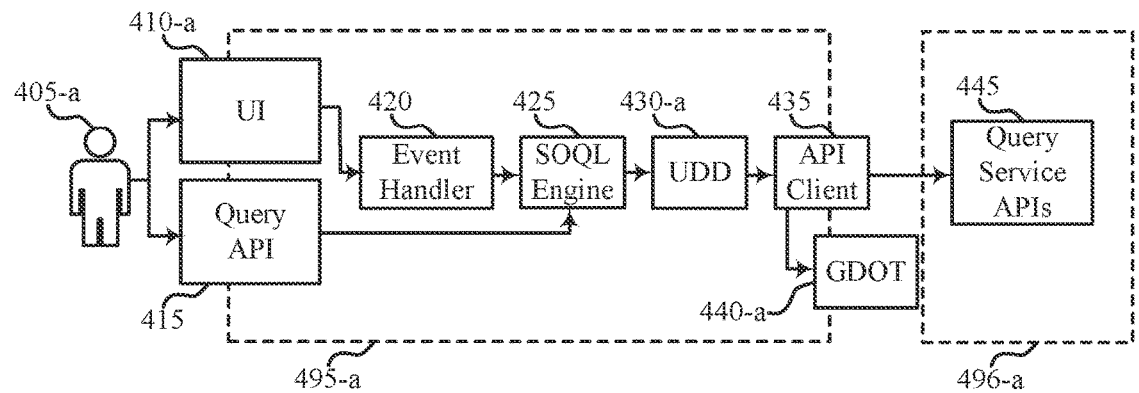
FIGS. 4A and 4B illustrate examples of a system architectures that support queries for external objects in accordance with aspects of the present disclosure.
Figure 4B:
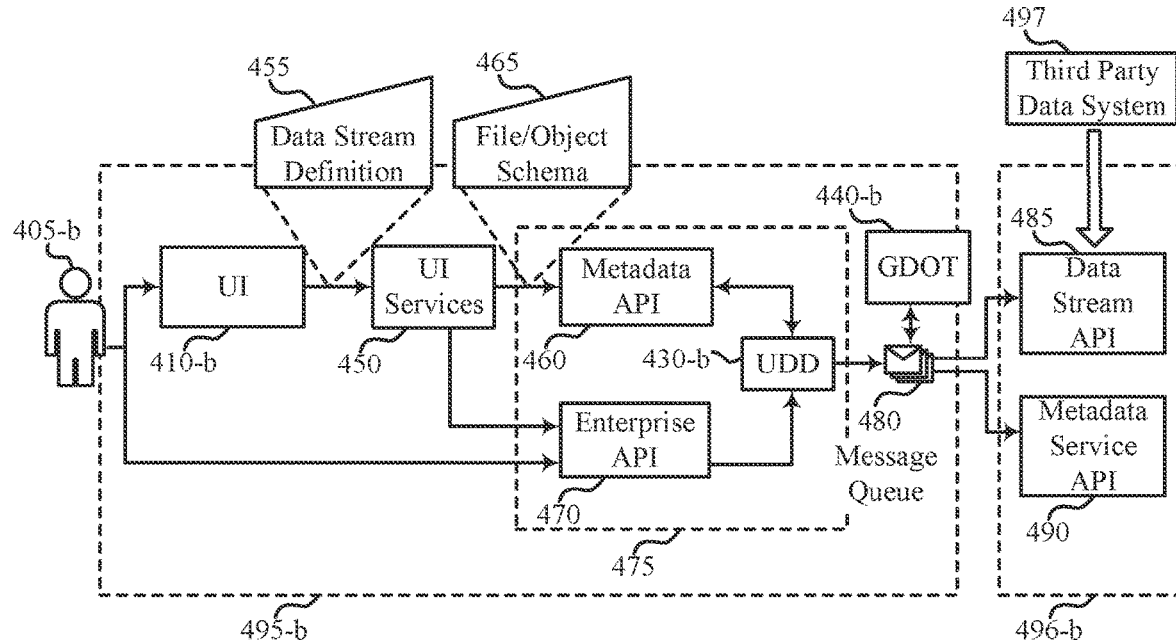

FIG. 4 illustrates examples of system architectures 400 that support querying for custom data objects in accordance with aspects of the present disclosure. The system architectures 400 may implement aspects of the systems 100, 200, and 300, as described with respect to FIGS. 1 through 3. For example, the system architectures 400 includes a core platform 495, which may include a relational database system 240 and 340 as described with respect to FIGS. 2 and 3 and associated services for supporting various clients and platforms. The core platform 495 may also be an example of aspects of cloud platform 115 of FIG. 1. The system architectures 400 include users 405, which may be examples of a user or employee of a tenant of a multi-tenant system. The user 405 may interact with platforms or services supported by the core platform 495. The system architectures 400 also include separate data systems 496, which may be examples of the separate data systems 245 and 345 as described with respect to FIGS. 2 and 3.

The user 405-a may interact with the core platform 495-a via one or more clients (e.g., client 205 of FIG. 2 or 305 of FIG. 3), such as a user interface (UI) component 410 or a query API 415. The UI components 410-a and 410-b may represent a front end or user interface system that is supported by the core platform 495-a. In some cases, the UI component 410-a and 410-b may be examples of lightning UI components. For example, the UI component 410-a may be used to configure custom applications (e.g., web application) using pre-configured or custom user interface components that are used to access data and perform processing using the data supported by the core platform 495-a (e.g., the relational database system). The query API 415 represents an endpoint that may be used for accessing the data and services of the core platform 495-a using various client systems. Thus, a client (e.g., client 205 or 305) may be configured to transmit API requests or queries to the query API 415 in order to access the data and services.

At system architecture 400-a, the user 405-a accesses the cloud platform 495-a at UI component 410-a and/or query API 415. UI component requests (e.g., requests triggered via a UI supported by the core platform 495-a) may be received at the event handler 420. The event handler 420 may represent a component that receives events from UI component 410-a and executes associated functions. In some cases, the event handler 420 may correspond to an object oriented event handling library configured via an object oriented programming language such as Java or Apex. Clients requests to the core platform 495-a at the query API 415 may be routed to a SOQL engine 425 or another type of query engine. Further, the event handler 420 may generate and execute queries, in response to UI events, that are received at the SOQL engine 425. The SOQL engine 425 may be an example of a query optimizer that analyzes target records and determines improved query formats for executing the query. The queries are received at a universal data directory (UDD) 430-a, which may represent an abstraction inside an application server that supports metadata configuration, including objects, fields, and relationships. Thus, as described herein, the schema for data objects stored in the separate data system 496-a may be managed at the UDD 430-a. As such, the UDD 430-a may contain a mapping of API names (which may be received in queries), entity information or object schemas, and key prefix values.

The UDD 430-a may support detection of a query that indicates an object of the separate data system 496-a (e.g., based on suffix and an API/developer name, as described herein), such as a custom object. Such queries may be routed to an API client 435, while queries that indicate objects stored in the core relational database system are executed internally. The API client 435 may use the data of the UDD 430-a to generate API requests for data of the separate data system 496-a. More particularly, the API client 435 may generate the API requests based on the initial query, the metadata information (e.g., the object schema), and tenant information from a global directory of tenants (GDOT) 440-a. The GDOT 440-a may maintain tenant information for tenants of the multi-tenant system as well as authentication information, such as tokens. Thus, the API client 435 may retrieve an authentication token corresponding to a tenant that is associated with the query and use the token in the API requests for the separate data system 496-a, such that trust is established or maintained between each of the systems (e.g., the core platform 495-a and the separate data system 496-a). The API requests are received at Query service APIs 445 (e.g., a server) of the separate data system 496-a, which executes the query to identify the data. Thus, using these techniques the core platform 495-a may support data requests for data that is stored and maintained within the core platform 495-a as well as data that is stored in a separate data system 496-a. Further, the core platform 495-a may maintain metadata (e.g., via the UDD 430-a) associated with the data associated with the separate data system 496-a in order to support retrieval of such data via the API requests.

System architecture 400-b illustrates various components that support data object initialization and data ingestion and processing. The system architecture 400-b may support creation and initialization of a custom object that is to be stored in the core platform 495-b or the separate data system 496-b, as described herein. The user 405-b may interact with a UI component 410-b to configure a new object, including selection of the name of the new object (e.g., developer name), fields for the new objects, as well as other information and parameters. The UE component 410-b may be supported by UI services component 450 that may handle events and trigger processes based on UI interaction. The user 405-b may also use a public API (e.g., enterprise API 470) to create a new object. When a custom object is created, that is not to be stored at the separate data system 496-b, the object is accessed via a core API 475 and metadata is created by a metadata API 460 and managed by the UDD 430-d.

When a custom object is to be created and stored at the separate system 496-b, the metadata API 460 may create metadata associated with the new custom object and the metadata may be managed by the UDD 430-b. Additionally, a metadata service API 490 of separate data system 496-b may be accessed in order to create the metadata of the new object at the separate data system 496-b as well as creation of the new data tables corresponding to the new custom object at the separate data system 496-b. Thus, when a new object is created, the metadata associated with the new custom object (e.g., the file/object schema 465) is stored at the core platform 495-b (e.g., via the UDD 430-d) as well as the separate data system 496-b. Further, the GDOT 440-b maintains the tenant information associated with the new custom object. For example, a tenant identifier may be used to create the workspace for the tenant in the separate data system 496-b. Thus, the GDOT 440-b may maintain the mapping of the tenant to the identifier of the workspace at the separate data system 496-b in order to create the tables at the separate data system 496-b.

The schema for the new custom object being copied to the separate data system 496-b may support reduced processing load for the core platform 495-b. More particularly, instead of the separate data system 496-b repeatedly requesting the object schema from the core platform 495-b in order to support data ingestion as new data is created by other external systems, the separate data system 496-b may utilize the stored object schema to ingest the new data without requesting the object schema from the core platform 495-a. Thus, the separate data system 496-b uses the schema for the configuration for data ingestion, credentials, location of source data and target location, and shape of the data (e.g., fields and columns.

To support the data ingestion at the off core system (e.g., the separate data system 496-b), the user 405-b may create a data stream definition 455 the UI component 410-b or using the enterprise API 470. The data stream definition 455 may include data translation parameters that define how external data is to be imported (e.g., column mappings, transformations, etc.) into the separate data system 496-b from a third party data system 497, which may be an example of a S3 bucket, MICROSOFT® azure system, GOOGLE® drive, or the like. When a user selects the third party data system 497 using the UI component 410-b, the third party data system 497 may be analyzed to determine the data configuration. Thus, the UI component 410-b may display a number of columns, object names, etc. for selection by the user 405-b. The user 405-b may use the UI component 410-b to map the columns of source data from the third party data system 497 to the columns of the new custom object. The mapping may include transformations such as concatenation. For example, third party data system may include columns for first name and last name. The user 405-b may create a field in the new custom object that is full name, that includes the first and last name concatenated. Thus, the user 405-b may define a concatenation of columns of the third party data system 497 for a column of the new custom object. This definition may be reflected in the data stream definition 455 which is copied to the separate data system 496-b in order to support data ingestion from the third party data system 497 at the separate data system 496-b, thus offloading processing from the core platform 495-b. These techniques may be used to support manipulation of the data to correspond to an information model that is used by various client services at the core platform 495. In some cases, the data stream definition 455 may include or may be associated with a schedule for data ingestion, which may be hourly, daily, weekly, etc.

Thus, the information (e.g., the data stream definition 455) that is indicated to the data stream API 485 may include the schema for the data of the third party data system 497, the schema customization (e.g., concatenation) to be applied during compute/ingestion, scheduling information, and data location information (e.g., of the new data object and the source data). User 405-b may update various aspects of the custom object (e.g., the name), the schema, or the data stream definition, such as the schedule. This updated information may be updated on the core platform 495-a and the separate data system 496-a in order to support the changes.

Message queue 480 may queue and transmit various messages for the separate data system 496-b, including new schemas, data stream definitions, and updates to both. The message queue 480 may use the GDOT 440-b to determine the tenant information for messages, including tenant to workplace identifier mappings.

Accordingly, the architecture 400-b may be used to configure a new custom object and a data stream for ingestion of data for the new custom object. The architecture 400-a may be used to support queries for these new custom objects. Thus, the described techniques support ingestion and processing of large amounts of data (e.g., trillions of rows of data) into the core platform 495 ecosystem without increasing the load on the core platform 495.

Figure 5:
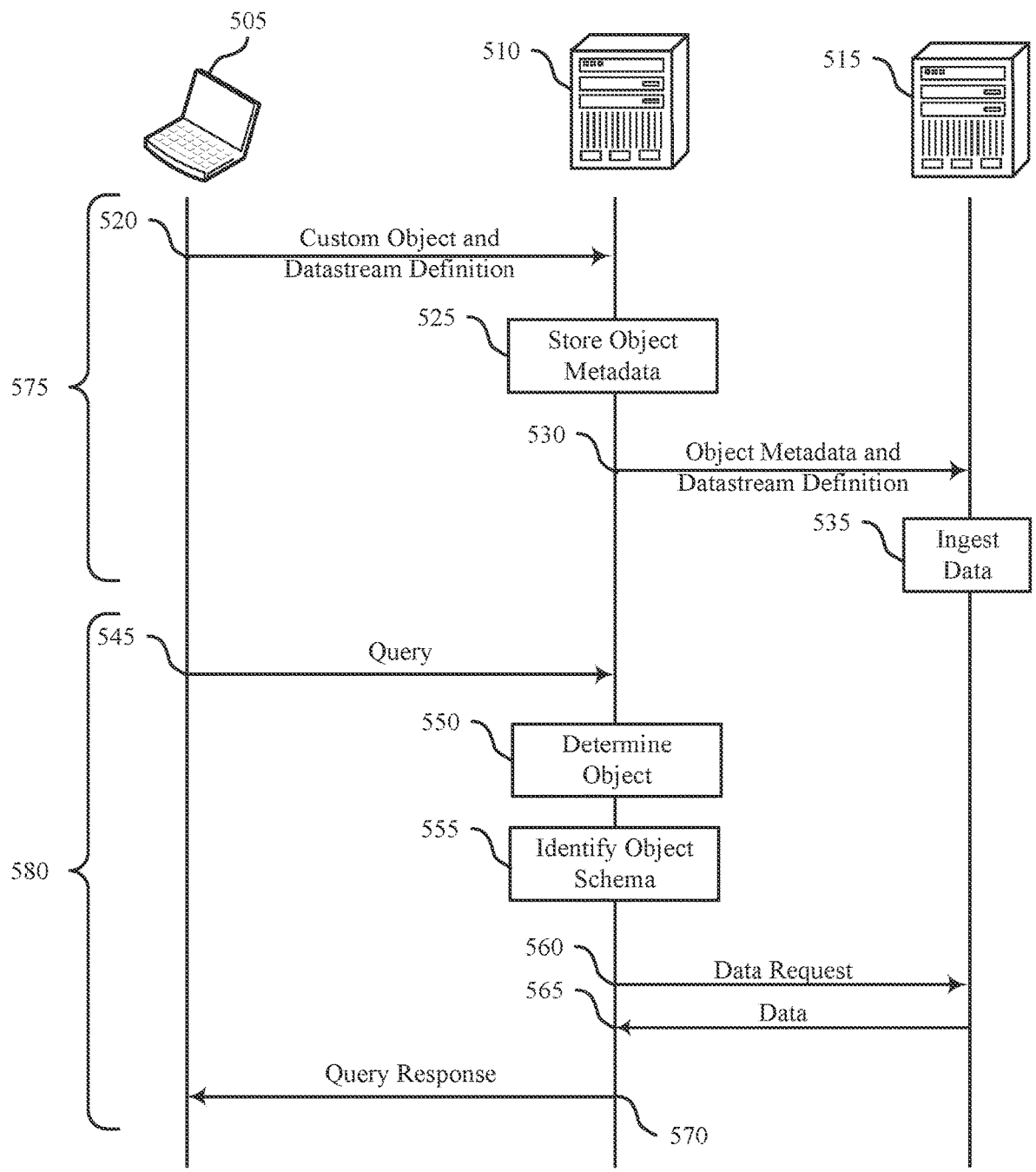
FIG. 5 illustrates an example of a process flow diagram that supports querying for custom data objects in accordance with aspects of the present disclosure.

FIG. 5 illustrates an example of a process flow diagram 500 that supports querying for custom data objects in accordance with aspects of the present disclosure. The process flow diagram 500 includes a client 505, a relational database system 510, and a separate data system 515, which may be examples of the corresponding devices and systems described with respect to FIGS. 1 through 4. For example, the client 505 may be an example of a UI component, a client accessing a query API, etc. or another type of client or service. The relational database system 510 may include aspects of or support a core system, as described with respect to FIGS. 1 through 4.

Object creation process 575 may include operations for creation of a new custom object according to techniques described herein. At 520, the client 505 may transmit an indication of a definition of a custom object and a data stream for ingestion of data corresponding to the custom object. For example, a user may access a UI platform supported by the core system to create a custom object, including name, fields/columns, etc. The user may also use the UI platform the create a data stream definition, which may include the identifier of a third party data system, the schema of the third party data, translation or mapping information of the third party data to the new custom object, an ingestion schedule, etc.

At 525, the relational database system 510 may store object metadata associated with the new custom object. The object metadata may include the object schema (e.g., column and field names), API definitions, entity information, etc. that may be used to identify the data. At 530, the object metadata and the data stream definition may be copied to the separate data system 515. The object metadata may be copied via a metadata API at the separate data system 515, and the data stream definition may be copied via a data stream API at the separate data system 515. Additionally, data tables for the new custom object may be created at the separate data system 515.

At 535, the separate data system 515 may ingest and process the data corresponding to the new custom object. The data may be ingested and processed according to the data stream definition, including transforming the data or the like. The data may now be available for querying at the relational database system 510.

Object querying process 580 may include operations for querying the relational database system 520 for data at the separate data system 515. At 545, the relational database system 510 may receive from the client 505 a query that is supported by the relational database system. The relational database system may be configured to store a plurality of data objects such that each data object is associated with a respective data table of a plurality of data tables of the relational database system. The query may be received via an API request or a UI component.

At 550, the relational database system 510 may determine that the query is indicative of a data object type that is associated with data stored in a data system 515 separate from the relational database system 510. The determining may be based on an indication in the query, such as an object/API suffix.

At 555, the relational database system 510 may identify, based at least in part on determining that the query is indicative of the data object type associated with data of the separate data system, a schema of the data object type using a schema record maintained by the relational database system. The schema may indicate fields associated with the object, location of the object, the API format used to access the object data, the shared key index value, etc.

At 560, the relational database system 510 may transmit, to the separate data system based at least in part on identifying the schema, a request for data associated with the query. The request may be an example of an API request that is generated based on the object schema.

At 565, the relational database system 510 may receive from the separate data system in response to the request, the requested data. At 570, the relational database system 510 may return, to the client 505, a query response that indicates the data retrieved from the separate data system.

Figure 6:
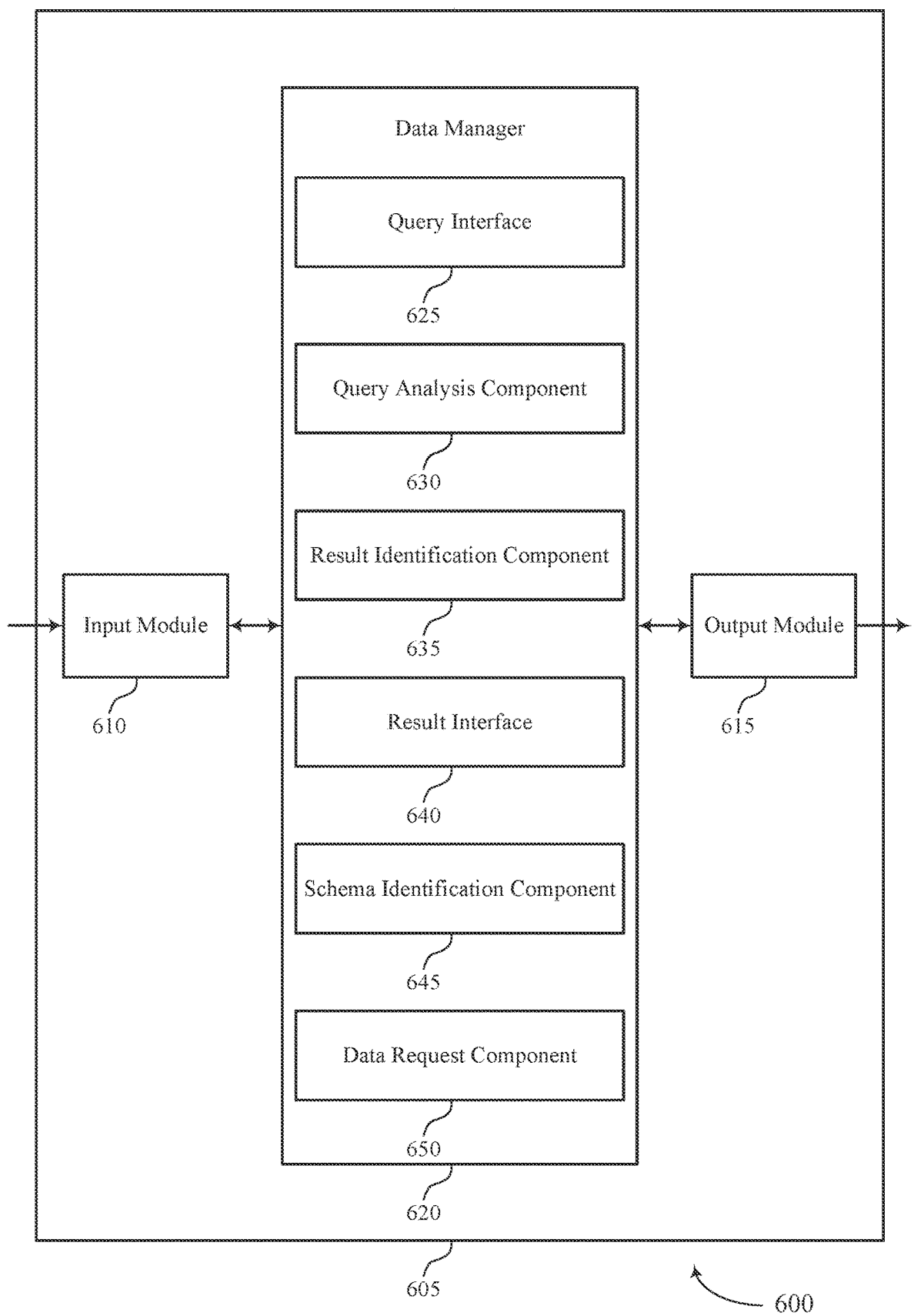
FIG. 6 shows a block diagram of an apparatus that supports querying for custom data objects in accordance with aspects of the present disclosure.

FIG. 6 shows a block diagram 600 of a device 605 that supports querying for custom data objects in accordance with aspects of the present disclosure. The device 605 may include an input module 610, an output module 615, and a data manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the data manager 620 to support querying for custom data objects. In some cases, the input module 610 may be a component of an I/O controller 810 as described with reference to FIG. 8.

The output module 615 may manage output signals for the device 605. For example, the output module 615 may receive signals from other components of the device 605, such as the data manager 620, and may transmit these signals to other components or devices. In some specific examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the data manager 620 may include a query interface 625, a query analysis component 630, a result identification component 635, a result interface 640, a schema identification component 645, a data request component 650, or any combination thereof. In some examples, the data manager 620, or various components thereof, may be configured to perform various operations (e.g., receiving, monitoring, transmitting) using or otherwise in cooperation with the input module 610, the output module 615, or both. For example, the data manager 620 may receive information from the input module 610, send information to the output module 615, or be integrated in combination with the input module 610, the output module 615, or both to receive information, transmit information, or perform various other operations as described herein.

The data manager 620 may support data processing in accordance with examples as disclosed herein. The query interface 625 may be configured as or otherwise support a means for receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system. The query analysis component 630 may be configured as or otherwise support a means for determining that the query is indicative of the data object of the first type, a plurality of data objects of the first type being associated with a same value of the key prefix by the relational database system such that the upper limit is exceeded. The result identification component 635 may be configured as or otherwise support a means for identifying, a result of the query based at least in part on determining that the query is indicative of the data object of the first type. The result interface 640 may be configured as or otherwise support a means for returning, to the client, a query response that indicates the result of the query.

Additionally or alternatively, the data manager 620 may support data processing in accordance with examples as disclosed herein. The query interface 625 may be configured as or otherwise support a means for receiving, from a client at a relational database system, a query that is supported by the relational database system, the relational database system being configured to store a plurality of data objects such that each data object is associated with a respective data table of a plurality of data tables of the relational database system. The query analysis component 630 may be configured as or otherwise support a means for determining that the query that is supported by the relational database system is indicative of a data object type that is associated with data stored in a data system separate from the relational database system. The schema identification component 645 may be configured as or otherwise support a means for identifying, based at least in part on determining that the query is indicative of the data object type associated with data of the separate data system, a schema of the data object type using a schema record maintained by the relational database system. The data request component 650 may be configured as or otherwise support a means for transmitting, to the separate data system based at least in part on identifying the schema, a request for data associated with the query. The result identification component 635 may be configured as or otherwise support a means for receiving, from the separate data system in response to the request, the requested data. The result interface 640 may be configured as or otherwise support a means for returning, to the client, a query response that indicates the data retrieved from the separate data system.

Figure 7:
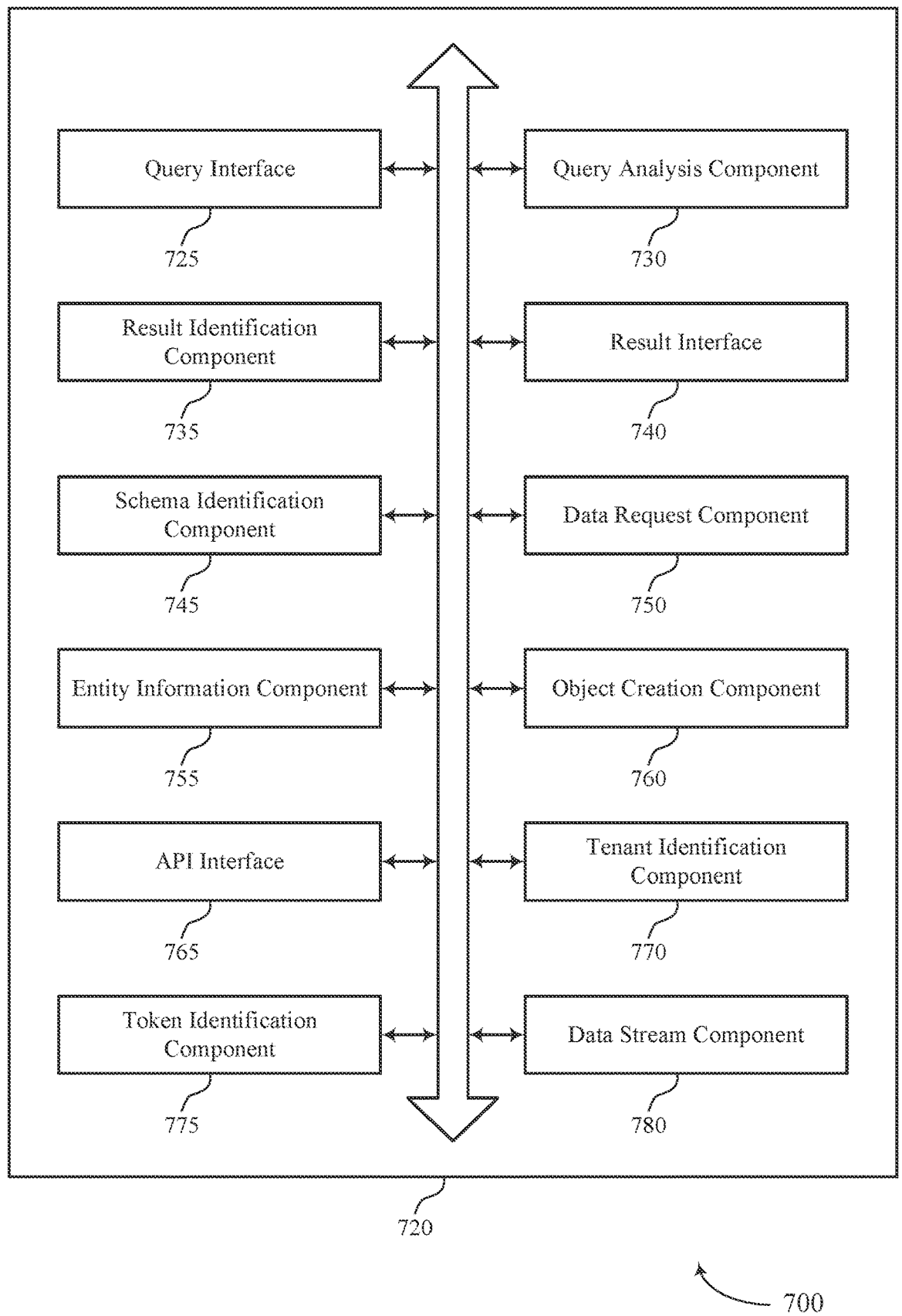
FIG. 7 shows a block diagram of a data manager that supports querying for custom data objects in accordance with aspects of the present disclosure.

FIG. 7 shows a block diagram 700 of a data manager 720 that supports querying for custom data objects in accordance with aspects of the present disclosure. The data manager 720 may be an example of aspects of a data manager or a data manager 620, or both, as described herein. The data manager 720, or various components thereof, may be an example of means for performing various aspects of querying for custom data objects as described herein. For example, the data manager 720 may include a query interface 725, a query analysis component 730, a result identification component 735, a result interface 740, a schema identification component 745, a data request component 750, an entity information component 755, an object creation component 760, an API interface 765, a tenant identification component 770, a token identification component 775, a data stream component 780, or any combination thereof. Each of these components may communicate, directly or indirectly, with one another (e.g., via one or more buses).

The data manager 720 may support data processing in accordance with examples as disclosed herein. The query interface 725 may be configured as or otherwise support a means for receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system. The query analysis component 730 may be configured as or otherwise support a means for determining that the query is indicative of the data object of the first type, a plurality of data objects of the first type being associated with a same value of the key prefix by the relational database system such that the upper limit is exceeded. The result identification component 735 may be configured as or otherwise support a means for identifying, a result of the query based at least in part on determining that the query is indicative of the data object of the first type. The result interface 740 may be configured as or otherwise support a means for returning, to the client, a query response that indicates the result of the query.

In some examples, the query analysis component 730 may be configured as or otherwise support a means for determining, based at least in part on determining that the query is indicative of the data object of the first type, that the data object is stored in a separate data system from the relational database system, wherein identifying the result of the query includes retrieving the result from the separate data system.

In some examples, to support identifying the result of the query, the API interface 765 may be configured as or otherwise support a means for transmitting, to the separate data system, an application programming interface request that is generated based at least in part on an entity identifier included in the query.

In some examples, the entity information component 755 may be configured as or otherwise support a means for identifying, based at least in part on determining that the query is indicative of the data object of the first type, entity information corresponding to the data object, wherein each of the plurality of data objects of the first type is associated with the same value of the key prefix but different entity information and wherein each of the plurality of data objects of the second type is associated with a different key prefix value that corresponds to respective entity information. In some examples, the result identification component 735 may be configured as or otherwise support a means for identifying the result of the query based at least in part on the identified entity information for the data object.

In some examples, the object creation component 760 may be configured as or otherwise support a means for receiving, at the relational database system, a request to create the data object of the first type, wherein the request includes an entity name corresponding to the data object. In some examples, the object creation component 760 may be configured as or otherwise support a means for causing a data table corresponding to the data object to be generated at a separate data system from the relational database system, each data object of the first type associated with a respective data table in the separate data system.

In some examples, the object creation component 760 may be configured as or otherwise support a means for associating the same value of the key prefix with the data object such data tables at the separate data system are configured to use the same value of the key prefix for the plurality of data objects of the first type, wherein the data object is identifiable from the separate data system based at least in part on the entity name corresponding to the data object.

In some examples, to support determining that the query is indicative of the data object of the first type, the query analysis component 730 may be configured as or otherwise support a means for identifying that the query includes an object suffix that indicates that the data object is of the first type.

Additionally or alternatively, the data manager 720 may support data processing in accordance with examples as disclosed herein. In some examples, the query interface 725 may be configured as or otherwise support a means for receiving, from a client at a relational database system, a query that is supported by the relational database system, the relational database system being configured to store a plurality of data objects such that each data object is associated with a respective data table of a plurality of data tables of the relational database system. In some examples, the query analysis component 730 may be configured as or otherwise support a means for determining that the query that is supported by the relational database system is indicative of a data object type that is associated with data stored in a data system separate from the relational database system. The schema identification component 745 may be configured as or otherwise support a means for identifying, based at least in part on determining that the query is indicative of the data object type associated with data of the separate data system, a schema of the data object type using a schema record maintained by the relational database system. The data request component 750 may be configured as or otherwise support a means for transmitting, to the separate data system based at least in part on identifying the schema, a request for data associated with the query. In some examples, the result identification component 735 may be configured as or otherwise support a means for receiving, from the separate data system in response to the request, the requested data. In some examples, the result interface 740 may be configured as or otherwise support a means for returning, to the client, a query response that indicates the data retrieved from the separate data system.

In some examples, the object creation component 760 may be configured as or otherwise support a means for receiving, at the relational database system, a request to create the data object of the data object type. In some examples, the object creation component 760 may be configured as or otherwise support a means for generating the schema of the data object type based at least in part on receiving the request. In some examples, the object creation component 760 may be configured as or otherwise support a means for transmitting, to the separate data system, an indication of the schema such that the separate data system is configured to ingest data corresponding to the data object type.

In some examples, to support generating the schema, the object creation component 760 may be configured as or otherwise support a means for receiving an indication of one or more columns to adjust for ingesting data corresponding to the data object type. In some examples, to support generating the schema, the data stream component 780 may be configured as or otherwise support a means for generating a data stream process based at least in part on receiving the indication, wherein the data stream process is configured to execute at the separate data system for ingesting data of the data object type.

In some examples, to support transmitting the request for the data, the API interface 765 may be configured as or otherwise support a means for transmitting, to the separate data system, an application programming interface request that is generated based at least in part on an entity identifier included in the query.

In some examples, the tenant identification component 770 may be configured as or otherwise support a means for identifying, based at least in part on the query, a tenant of a plurality of tenants supported by the relational database system. In some examples, the token identification component 775 may be configured as or otherwise support a means for identifying a token that is associated with the identified tenant is to be used for authenticating the request to the separate data system, wherein the token is transmitted with the request such that the request is authenticated.

In some examples, the entity information component 755 may be configured as or otherwise support a means for identifying, based at least in part on determining that the query is indicative of the data object type associated with data stored in the separate data system, entity information associated with the data object. In some examples, the schema identification component 745 may be configured as or otherwise support a means for identifying the schema of the data object type based at least in part on the entity information.

In some examples, to support determining that the query is indicative of the data object type, the query analysis component 730 may be configured as or otherwise support a means for identifying that the query includes an object suffix that indicates that the data object is of the data object type that is associated with the data stored in the separate data system. In some examples, the separate data system is a non-relational database system.

Figure 8:
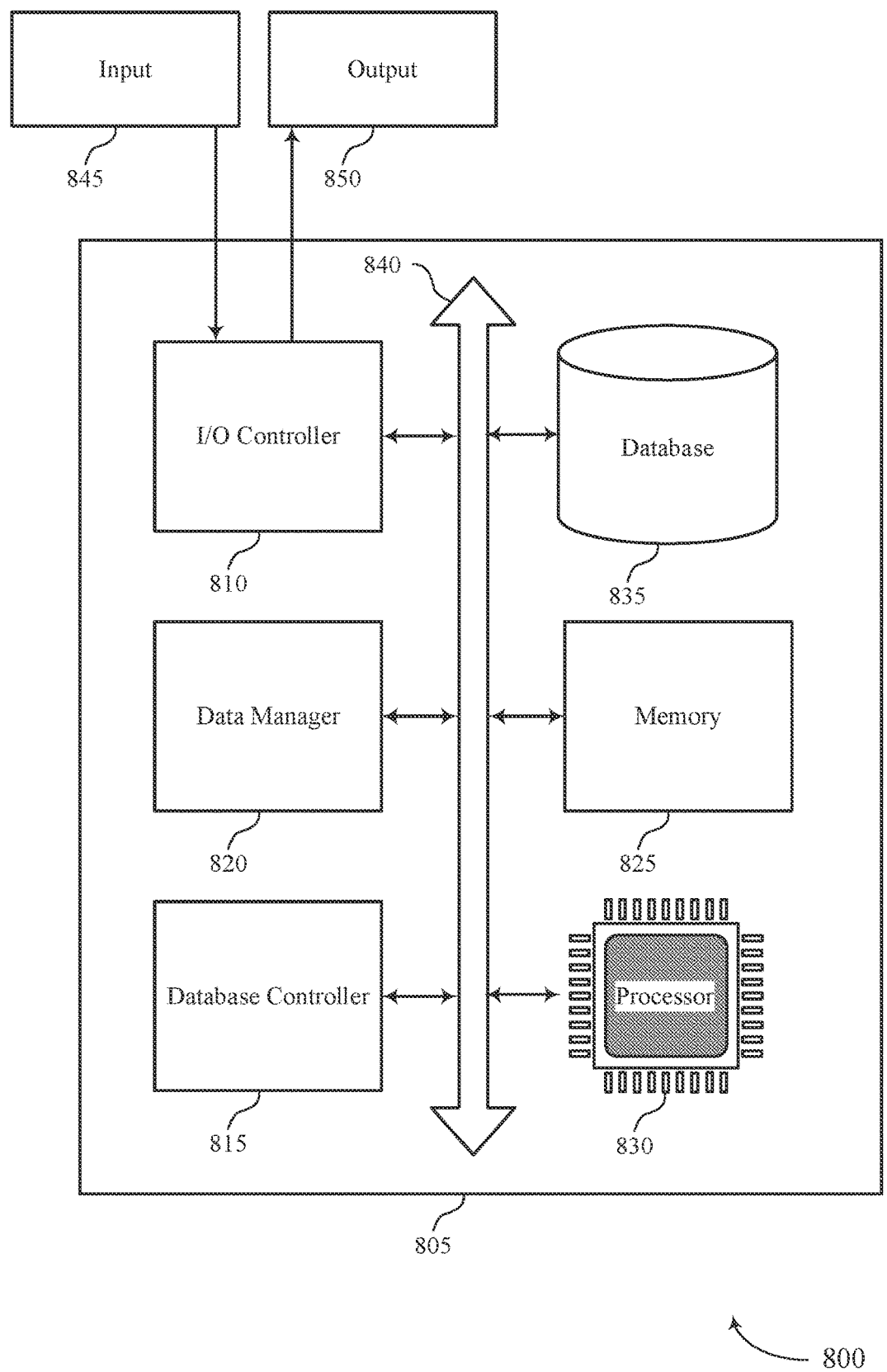
FIG. 8 shows a diagram of a system including a device that supports querying for custom data objects in accordance with aspects of the present disclosure.

FIG. 8 shows a diagram of a system 800 including a device 805 that supports querying for custom data objects in accordance with aspects of the present disclosure. The device 805 may be an example of or include the components of a device 605 as described herein. The device 805 may include components for bi-directional data communications including components for transmitting and receiving communications, such as a data manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor. In some cases, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting querying for custom data objects).

The data manager 820 may support data processing in accordance with examples as disclosed herein. For example, the data manager 820 may be configured as or otherwise support a means for receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system. The data manager 820 may be configured as or otherwise support a means for determining that the query is indicative of the data object of the first type, a plurality of data objects of the first type being associated with a same value of the key prefix by the relational database system such that the upper limit is exceeded. The data manager 820 may be configured as or otherwise support a means for identifying, a result of the query based at least in part on determining that the query is indicative of the data object of the first type. The data manager 820 may be configured as or otherwise support a means for returning, to the client, a query response that indicates the result of the query.

Additionally or alternatively, the data manager 820 may support data processing in accordance with examples as disclosed herein. For example, the data manager 820 may be configured as or otherwise support a means for receiving, from a client at a relational database system, a query that is supported by the relational database system, the relational database system being configured to store a plurality of data objects such that each data object is associated with a respective data table of a plurality of data tables of the relational database system. The data manager 820 may be configured as or otherwise support a means for determining that the query that is supported by the relational database system is indicative of a data object type that is associated with data stored in a data system separate from the relational database system. The data manager 820 may be configured as or otherwise support a means for identifying, based at least in part on determining that the query is indicative of the data object type associated with data of the separate data system, a schema of the data object type using a schema record maintained by the relational database system. The data manager 820 may be configured as or otherwise support a means for transmitting, to the separate data system based at least in part on identifying the schema, a request for data associated with the query. The data manager 820 may be configured as or otherwise support a means for receiving, from the separate data system in response to the request, the requested data. The data manager 820 may be configured as or otherwise support a means for returning, to the client, a query response that indicates the data retrieved from the separate data system.

Figure 9:
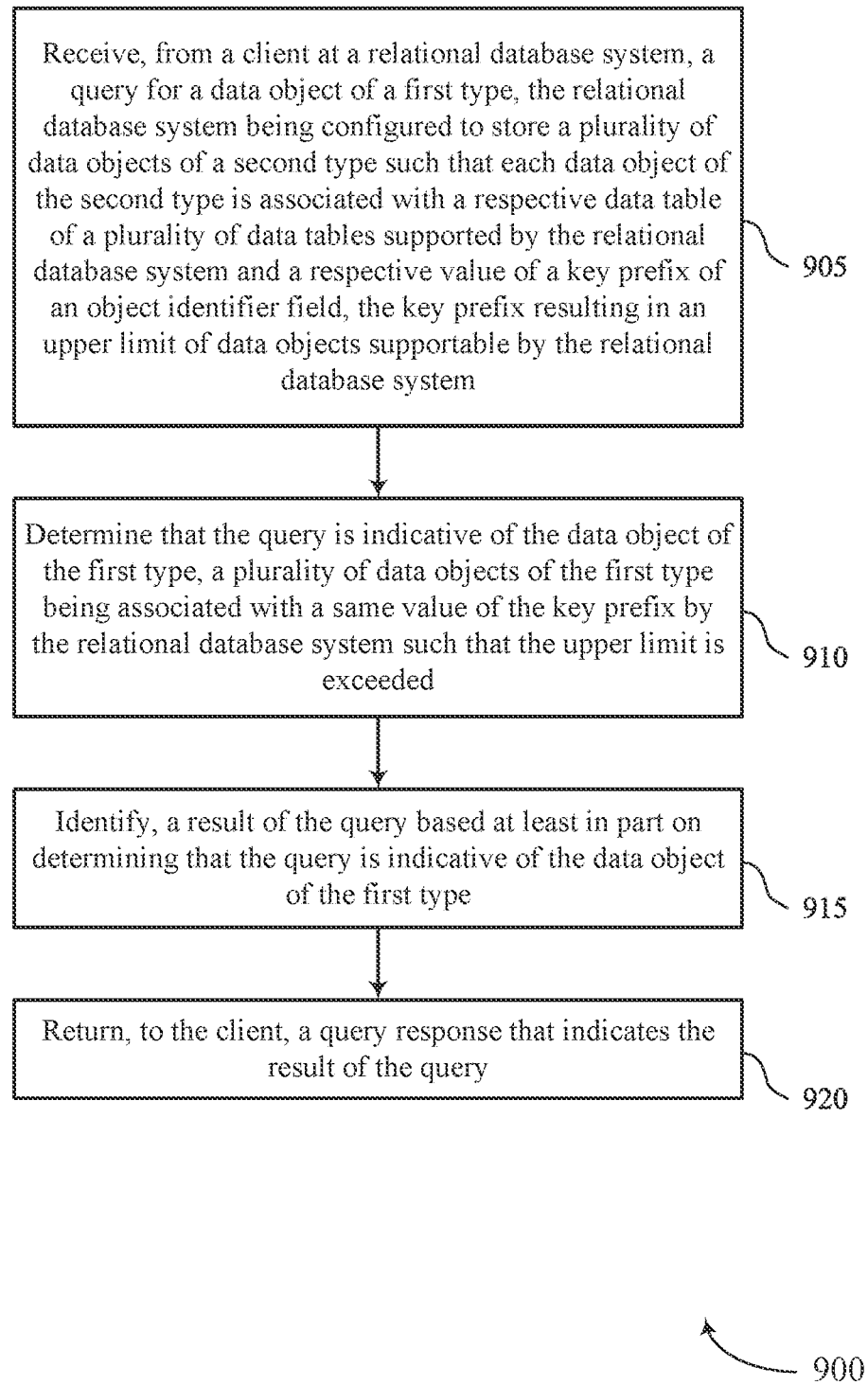
FIGS. 9 through 14 show flowcharts illustrating methods that support querying for custom data objects in accordance with aspects of the present disclosure.

FIG. 9 shows a flowchart illustrating a method 900 that supports querying for custom data objects in accordance with aspects of the present disclosure. The operations of the method 900 may be implemented by a Data server or its components as described herein. For example, the operations of the method 900 may be performed by a Data server as described with reference to FIGs. FIGS. 1 through 8. In some examples, a Data server may execute a set of instructions to control the functional elements of the Data server to perform the described functions. Additionally or alternatively, the Data server may perform aspects of the described functions using special-purpose hardware.

At 905, the method may include receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system. The operations of 905 may be performed in accordance with examples as disclosed herein. In some examples, aspects of the operations of 905 may be performed by a query interface 725 as described with reference to FIG. 7.

At 910, the method may include determining that the query is indicative of the data object of the first type, a plurality of data objects of the first type being associated with a same value of the key prefix by the relational database system such that the upper limit is exceeded. The operations of 910 may be performed in accordance with examples as disclosed herein. In some examples, aspects of the operations of 910 may be performed by a query analysis component 730 as described with reference to FIG. 7.

At 915, the method may include identifying, a result of the query based at least in part on determining that the query is indicative of the data object of the first type. The operations of 915 may be performed in accordance with examples as disclosed herein. In some examples, aspects of the operations of 915 may be performed by a result identification component 735 as described with reference to FIG. 7.

At 920, the method may include returning, to the client, a query response that indicates the result of the query. The operations of 920 may be performed in accordance with examples as disclosed herein. In some examples, aspects of the operations of 920 may be performed by a result interface 740 as described with reference to FIG. 7.

Figure 10:
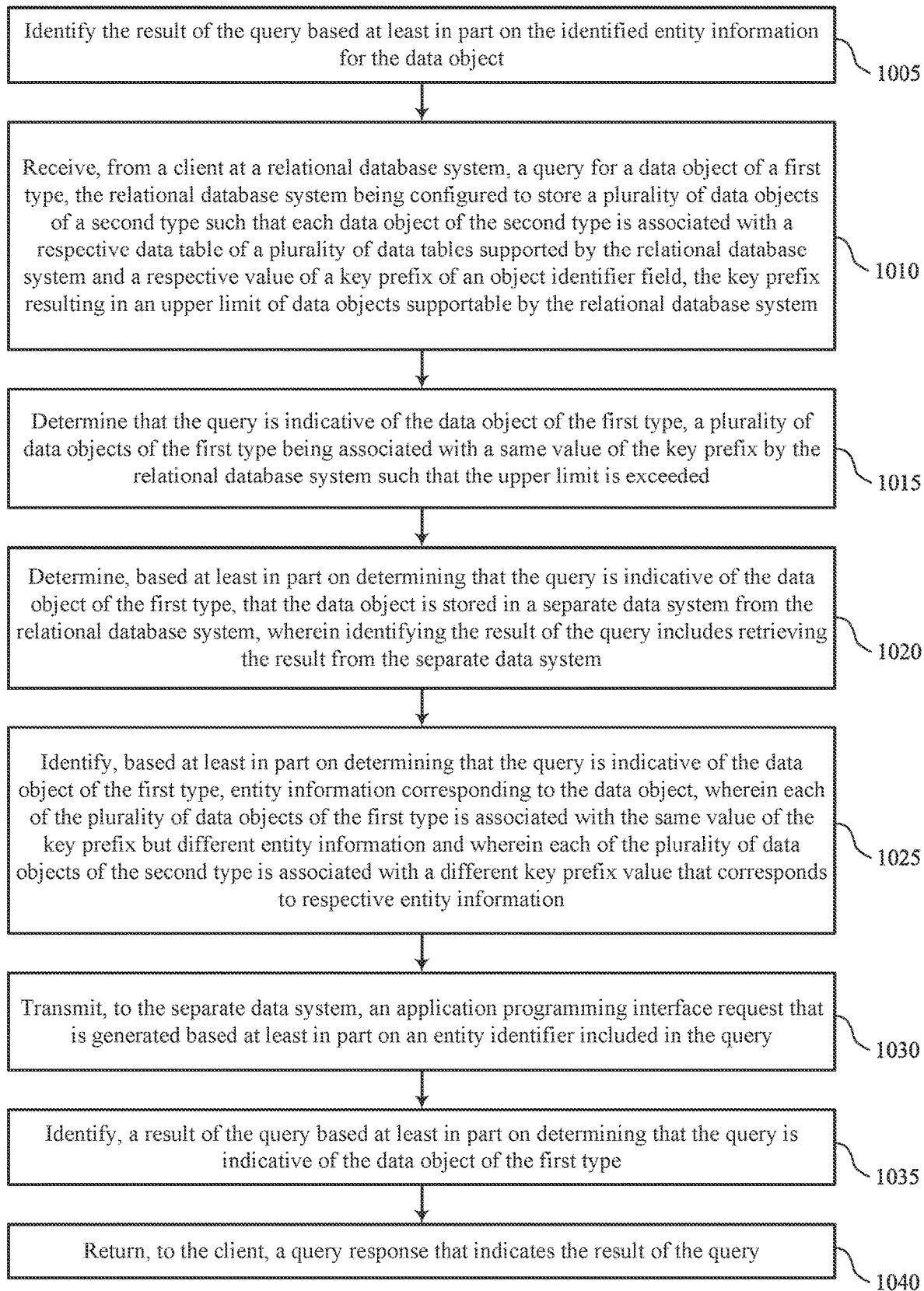

FIG. 10 shows a flowchart illustrating a method 1000 that supports querying for custom data objects in accordance with aspects of the present disclosure. The operations of the method 1000 may be implemented by a Data server or its components as described herein. For example, the operations of the method 1000 may be performed by a Data server as described with reference to FIGs. FIG. 1 through 8. In some examples, a Data server may execute a set of instructions to control the functional elements of the Data server to perform the described functions. Additionally or alternatively, the Data server may perform aspects of the described functions using special-purpose hardware.

At 1005, the method may include identifying the result of the query based at least in part on the identified entity information for the data object. The operations of 1005 may be performed in accordance with examples as disclosed herein. In some examples, aspects of the operations of 1005 may be performed by a result identification component 735 as described with reference to FIG. 7.

At 1010, the method may include receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system. The operations of 1010 may be performed in accordance with examples as disclosed herein. In some examples, aspects of the operations of 1010 may be performed by a query interface 725 as described with reference to FIG. 7.

At 1015, the method may include determining that the query is indicative of the data object of the first type, a plurality of data objects of the first type being associated with a same value of the key prefix by the relational database system such that the upper limit is exceeded. The operations of 1015 may be performed in accordance with examples as disclosed herein. In some examples, aspects of the operations of 1015 may be performed by a query analysis component 730 as described with reference to FIG. 7.

At 1020, the method may include identifying, based at least in part on determining that the query is indicative of the data object of the first type, entity information corresponding to the data object, wherein each of the plurality of data objects of the first type is associated with the same value of the key prefix but different entity information and wherein each of the plurality of data objects of the second type is associated with a different key prefix value that corresponds to respective entity information. The operations of 1020 may be performed in accordance with examples as disclosed herein. In some examples, aspects of the operations of 1020 may be performed by an entity information component 755 as described with reference to FIG. 7.

At 1025, the method may include determining, based at least in part on determining that the query is indicative of the data object of the first type, that the data object is stored in a separate data system from the relational database system, wherein identifying the result of the query includes retrieving the result from the separate data system. The operations of 1025 may be performed in accordance with examples as disclosed herein. In some examples, aspects of the operations of 1025 may be performed by a query analysis component 730 as described with reference to FIG. 7.

At 1030, the method may include transmitting, to the separate data system, an application programming interface request that is generated based at least in part on an entity identifier included in the query. The operations of 1030 may be performed in accordance with examples as disclosed herein. In some examples, aspects of the operations of 1030 may be performed by an API interface 765 as described with reference to FIG. 7.

At 1035, the method may include identifying, a result of the query based at least in part on determining that the query is indicative of the data object of the first type. The operations of 1035 may be performed in accordance with examples as disclosed herein. In some examples, aspects of the operations of 1035 may be performed by a result identification component 735 as described with reference to FIG. 7.

At 1040, the method may include returning, to the client, a query response that indicates the result of the query. The operations of 1040 may be performed in accordance with examples as disclosed herein. In some examples, aspects of the operations of 1040 may be performed by a result interface 740 as described with reference to FIG. 7.

Figure 11:
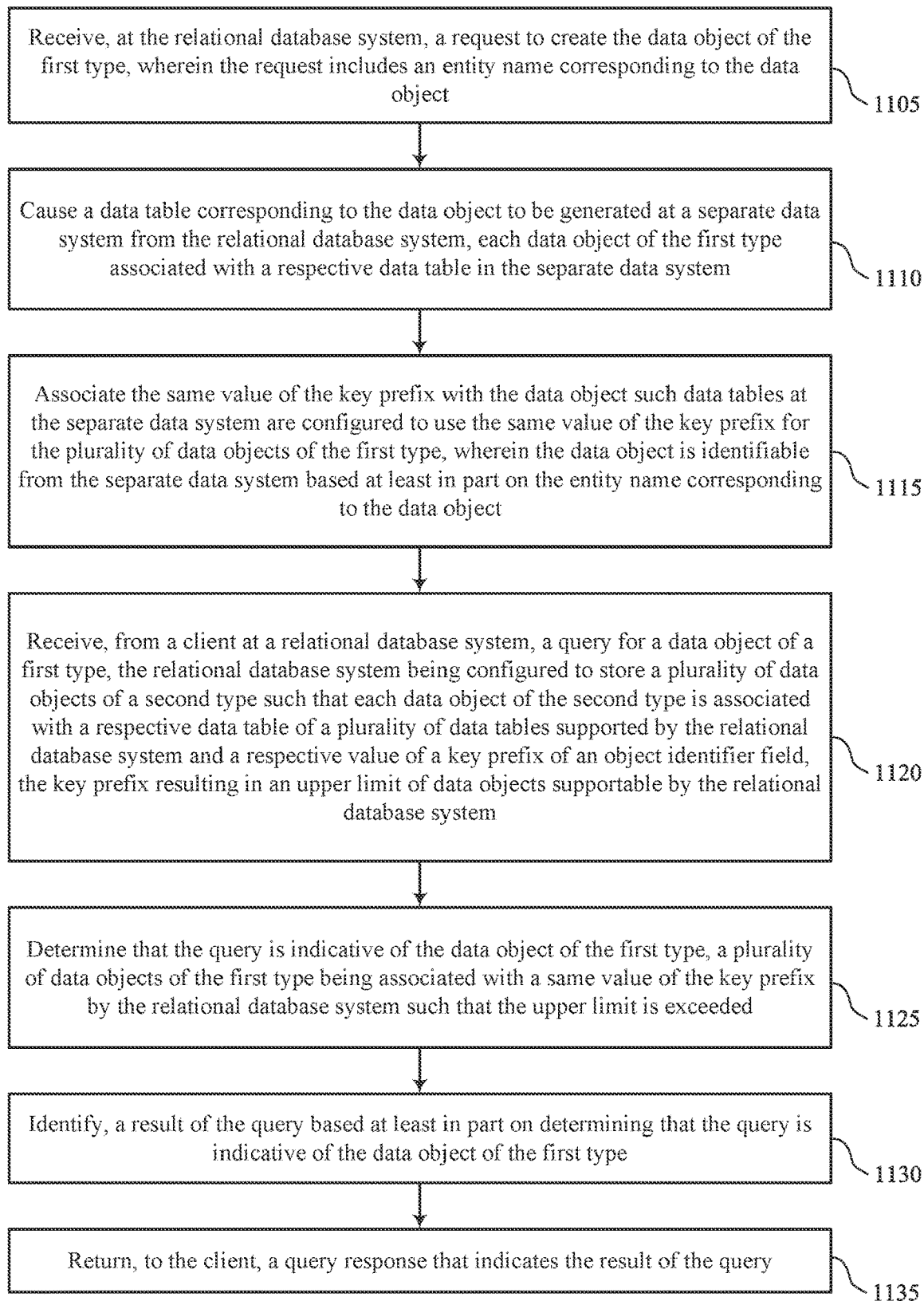

FIG. 11 shows a flowchart illustrating a method 1100 that supports querying for custom data objects in accordance with aspects of the present disclosure. The operations of the method 1100 may be implemented by a Data server or its components as described herein. For example, the operations of the method 1100 may be performed by a Data server as described with reference to FIGs. FIG. 1 through 8. In some examples, a Data server may execute a set of instructions to control the functional elements of the Data server to perform the described functions. Additionally or alternatively, the Data server may perform aspects of the described functions using special-purpose hardware.

At 1105, the method may include receiving, at the relational database system, a request to create the data object of the first type, wherein the request includes an entity name corresponding to the data object. The operations of 1105 may be performed in accordance with examples as disclosed herein. In some examples, aspects of the operations of 1105 may be performed by an object creation component 760 as described with reference to FIG. 7.

At 1110, the method may include causing a data table corresponding to the data object to be generated at a separate data system from the relational database system, each data object of the first type associated with a respective data table in the separate data system. The operations of 1110 may be performed in accordance with examples as disclosed herein. In some examples, aspects of the operations of 1110 may be performed by an object creation component 760 as described with reference to FIG. 7.

At 1115, the method may include associating the same value of the key prefix with the data object such data tables at the separate data system are configured to use the same value of the key prefix for the plurality of data objects of the first type, wherein the data object is identifiable from the separate data system based at least in part on the entity name corresponding to the data object. The operations of 1115 may be performed in accordance with examples as disclosed herein. In some examples, aspects of the operations of 1115 may be performed by an object creation component 760 as described with reference to FIG. 7.

At 1120, the method may include receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system. The operations of 1120 may be performed in accordance with examples as disclosed herein. In some examples, aspects of the operations of 1120 may be performed by a query interface 725 as described with reference to FIG. 7.

At 1125, the method may include determining that the query is indicative of the data object of the first type, a plurality of data objects of the first type being associated with a same value of the key prefix by the relational database system such that the upper limit is exceeded. The operations of 1125 may be performed in accordance with examples as disclosed herein. In some examples, aspects of the operations of 1125 may be performed by a query analysis component 730 as described with reference to FIG. 7.

At 1130, the method may include identifying, a result of the query based at least in part on determining that the query is indicative of the data object of the first type. The operations of 1130 may be performed in accordance with examples as disclosed herein. In some examples, aspects of the operations of 1130 may be performed by a result identification component 735 as described with reference to FIG. 7.

At 1135, the method may include returning, to the client, a query response that indicates the result of the query. The operations of 1135 may be performed in accordance with examples as disclosed herein. In some examples, aspects of the operations of 1135 may be performed by a result interface 740 as described with reference to FIG. 7.

Figure 12:
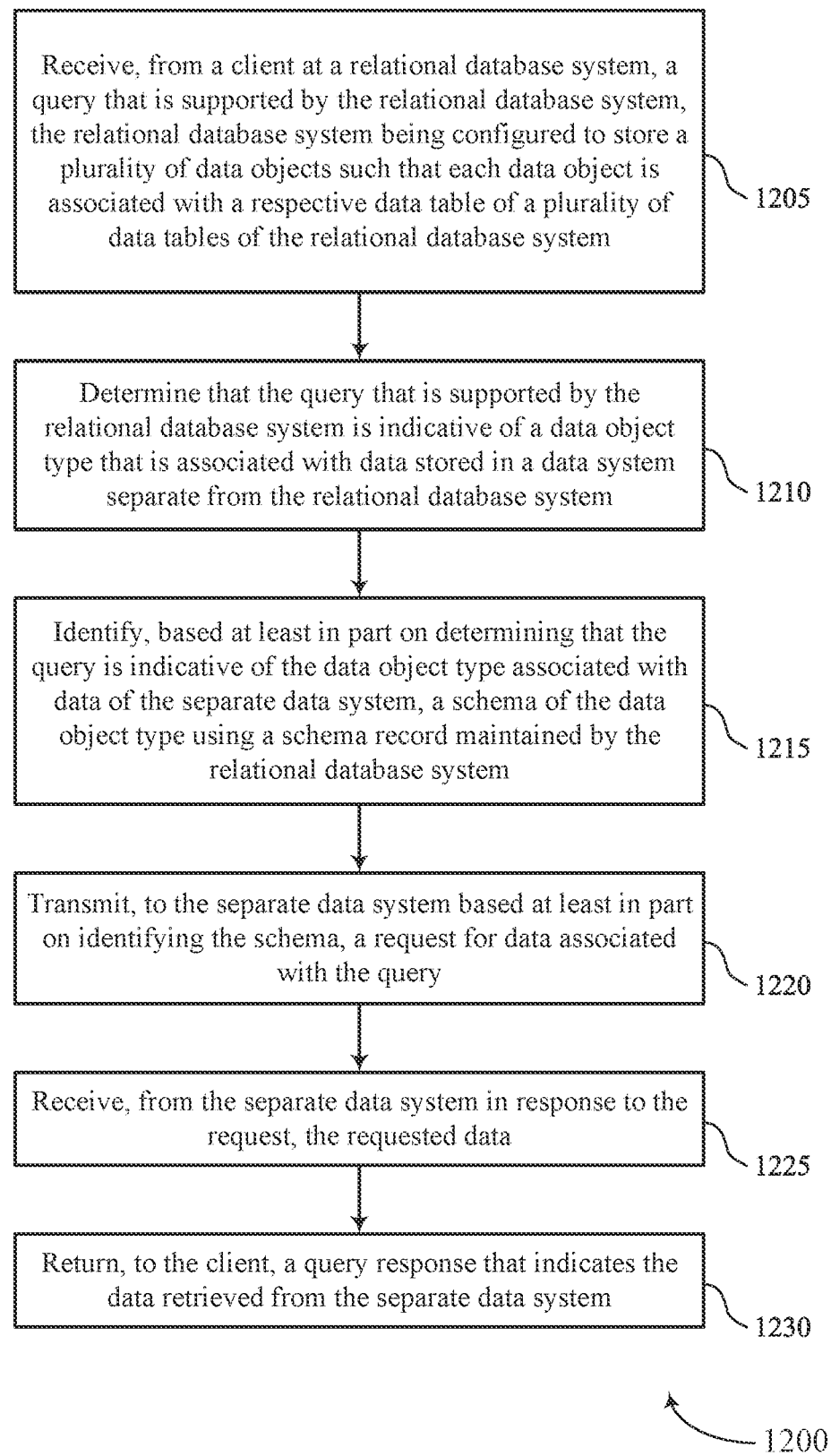

FIG. 12 shows a flowchart illustrating a method 1200 that supports querying for custom data objects in accordance with aspects of the present disclosure. The operations of the method 1200 may be implemented by a Data server or its components as described herein. For example, the operations of the method 1200 may be performed by a Data server as described with reference to FIGs. FIG. 1 through 8. In some examples, a Data server may execute a set of instructions to control the functional elements of the Data server to perform the described functions. Additionally or alternatively, the Data server may perform aspects of the described functions using special-purpose hardware.

At 1205, the method may include receiving, from a client at a relational database system, a query that is supported by the relational database system, the relational database system being configured to store a plurality of data objects such that each data object is associated with a respective data table of a plurality of data tables of the relational database system. The operations of 1205 may be performed in accordance with examples as disclosed herein. In some examples, aspects of the operations of 1205 may be performed by a query interface 725 as described with reference to FIG. 7.

At 1210, the method may include determining that the query that is supported by the relational database system is indicative of a data object type that is associated with data stored in a data system separate from the relational database system. The operations of 1210 may be performed in accordance with examples as disclosed herein. In some examples, aspects of the operations of 1210 may be performed by a query analysis component 730 as described with reference to FIG. 7.

At 1215, the method may include identifying, based at least in part on determining that the query is indicative of the data object type associated with data of the separate data system, a schema of the data object type using a schema record maintained by the relational database system. The operations of 1215 may be performed in accordance with examples as disclosed herein. In some examples, aspects of the operations of 1215 may be performed by a schema identification component 745 as described with reference to FIG. 7.

At 1220, the method may include transmitting, to the separate data system based at least in part on identifying the schema, a request for data associated with the query. The operations of 1220 may be performed in accordance with examples as disclosed herein. In some examples, aspects of the operations of 1220 may be performed by a data request component 750 as described with reference to FIG. 7.

At 1225, the method may include receiving, from the separate data system in response to the request, the requested data. The operations of 1225 may be performed in accordance with examples as disclosed herein. In some examples, aspects of the operations of 1225 may be performed by a result identification component 735 as described with reference to FIG. 7.

At 1230, the method may include returning, to the client, a query response that indicates the data retrieved from the separate data system. The operations of 1230 may be performed in accordance with examples as disclosed herein. In some examples, aspects of the operations of 1230 may be performed by a result interface 740 as described with reference to FIG. 7.

Figure 13:
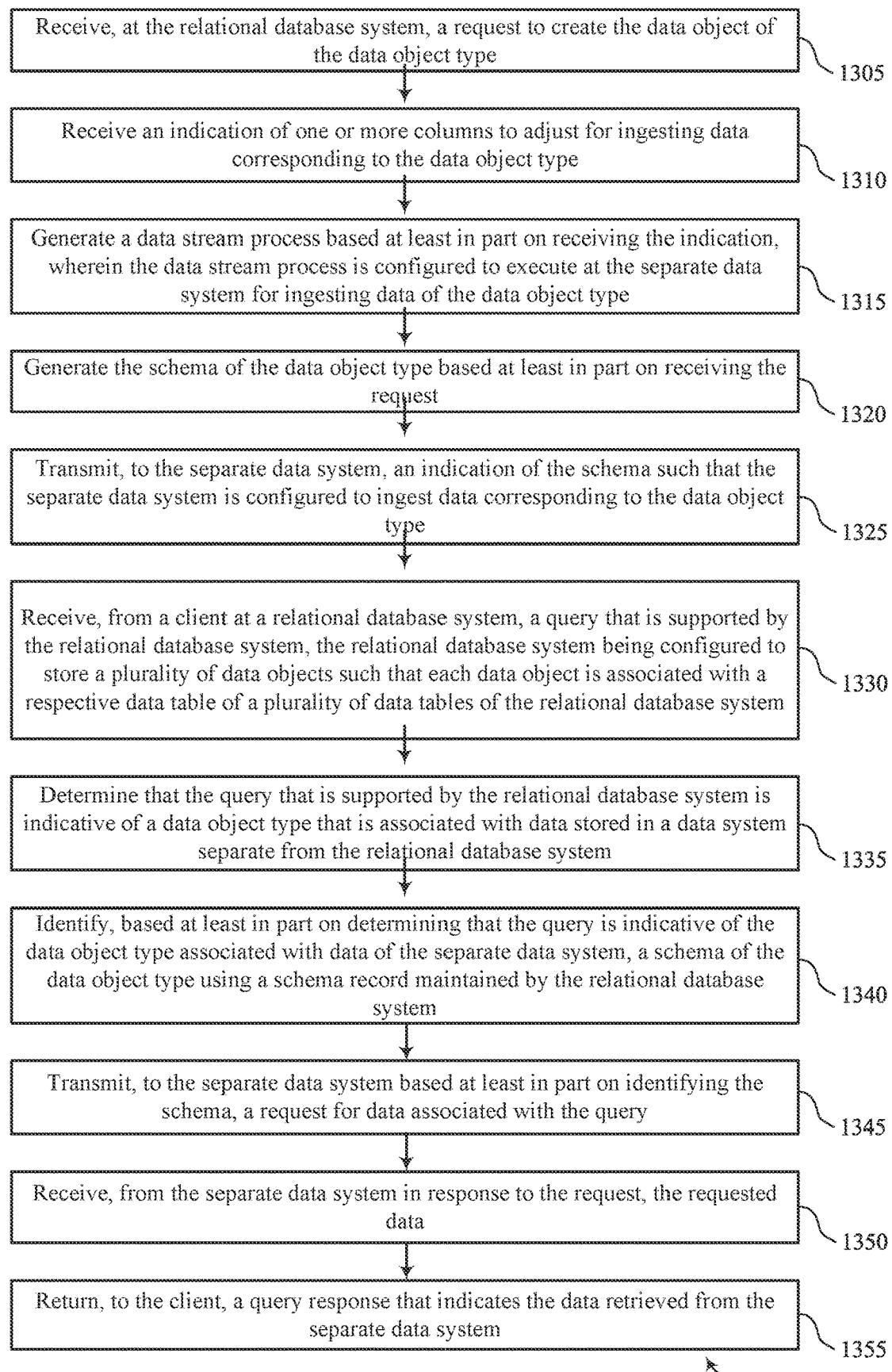

FIG. 13 shows a flowchart illustrating a method 1300 that supports querying for custom data objects in accordance with aspects of the present disclosure. The operations of the method 1300 may be implemented by a Data server or its components as described herein. For example, the operations of the method 1300 may be performed by a Data server as described with reference to FIGs. FIG. 1 through 8. In some examples, a Data server may execute a set of instructions to control the functional elements of the Data server to perform the described functions. Additionally or alternatively, the Data server may perform aspects of the described functions using special-purpose hardware.

At 1305, the method may include receiving, at the relational database system, a request to create the data object of the data object type. The operations of 1305 may be performed in accordance with examples as disclosed herein. In some examples, aspects of the operations of 1305 may be performed by an object creation component 760 as described with reference to FIG. 7.

At 1310, the method may include receiving an indication of one or more columns to adjust for ingesting data corresponding to the data object type. The operations of 1310 may be performed in accordance with examples as disclosed herein. In some examples, aspects of the operations of 1310 may be performed by an object creation component 760 as described with reference to FIG. 7.

At 1315, the method may include generating a data stream process based at least in part on receiving the indication, wherein the data stream process is configured to execute at the separate data system for ingesting data of the data object type. The operations of 1315 may be performed in accordance with examples as disclosed herein. In some examples, aspects of the operations of 1315 may be performed by a data stream component 780 as described with reference to FIG. 7.

At 1320, the method may include generating the schema of the data object type based at least in part on receiving the request. The operations of 1320 may be performed in accordance with examples as disclosed herein. In some examples, aspects of the operations of 1320 may be performed by an object creation component 760 as described with reference to FIG. 7.

At 1325, the method may include transmitting, to the separate data system, an indication of the schema such that the separate data system is configured to ingest data corresponding to the data object type. The operations of 1325 may be performed in accordance with examples as disclosed herein. In some examples, aspects of the operations of 1325 may be performed by an object creation component 760 as described with reference to FIG. 7.

At 1330, the method may include receiving, from a client at a relational database system, a query that is supported by the relational database system, the relational database system being configured to store a plurality of data objects such that each data object is associated with a respective data table of a plurality of data tables of the relational database system. The operations of 1330 may be performed in accordance with examples as disclosed herein. In some examples, aspects of the operations of 1330 may be performed by a query interface 725 as described with reference to FIG. 7.

At 1335, the method may include determining that the query that is supported by the relational database system is indicative of a data object type that is associated with data stored in a data system separate from the relational database system. The operations of 1335 may be performed in accordance with examples as disclosed herein. In some examples, aspects of the operations of 1335 may be performed by a query analysis component 730 as described with reference to FIG. 7.

At 1340, the method may include identifying, based at least in part on determining that the query is indicative of the data object type associated with data of the separate data system, a schema of the data object type using a schema record maintained by the relational database system. The operations of 1340 may be performed in accordance with examples as disclosed herein. In some examples, aspects of the operations of 1340 may be performed by a schema identification component 745 as described with reference to FIG. 7.

At 1345, the method may include transmitting, to the separate data system based at least in part on identifying the schema, a request for data associated with the query. The operations of 1345 may be performed in accordance with examples as disclosed herein. In some examples, aspects of the operations of 1345 may be performed by a data request component 750 as described with reference to FIG. 7.

At 1350, the method may include receiving, from the separate data system in response to the request, the requested data. The operations of 1350 may be performed in accordance with examples as disclosed herein. In some examples, aspects of the operations of 1350 may be performed by a result identification component 735 as described with reference to FIG. 7.

At 1355, the method may include returning, to the client, a query response that indicates the data retrieved from the separate data system. The operations of 1355 may be performed in accordance with examples as disclosed herein. In some examples, aspects of the operations of 1355 may be performed by a result interface 740 as described with reference to FIG. 7.

Figure 14:
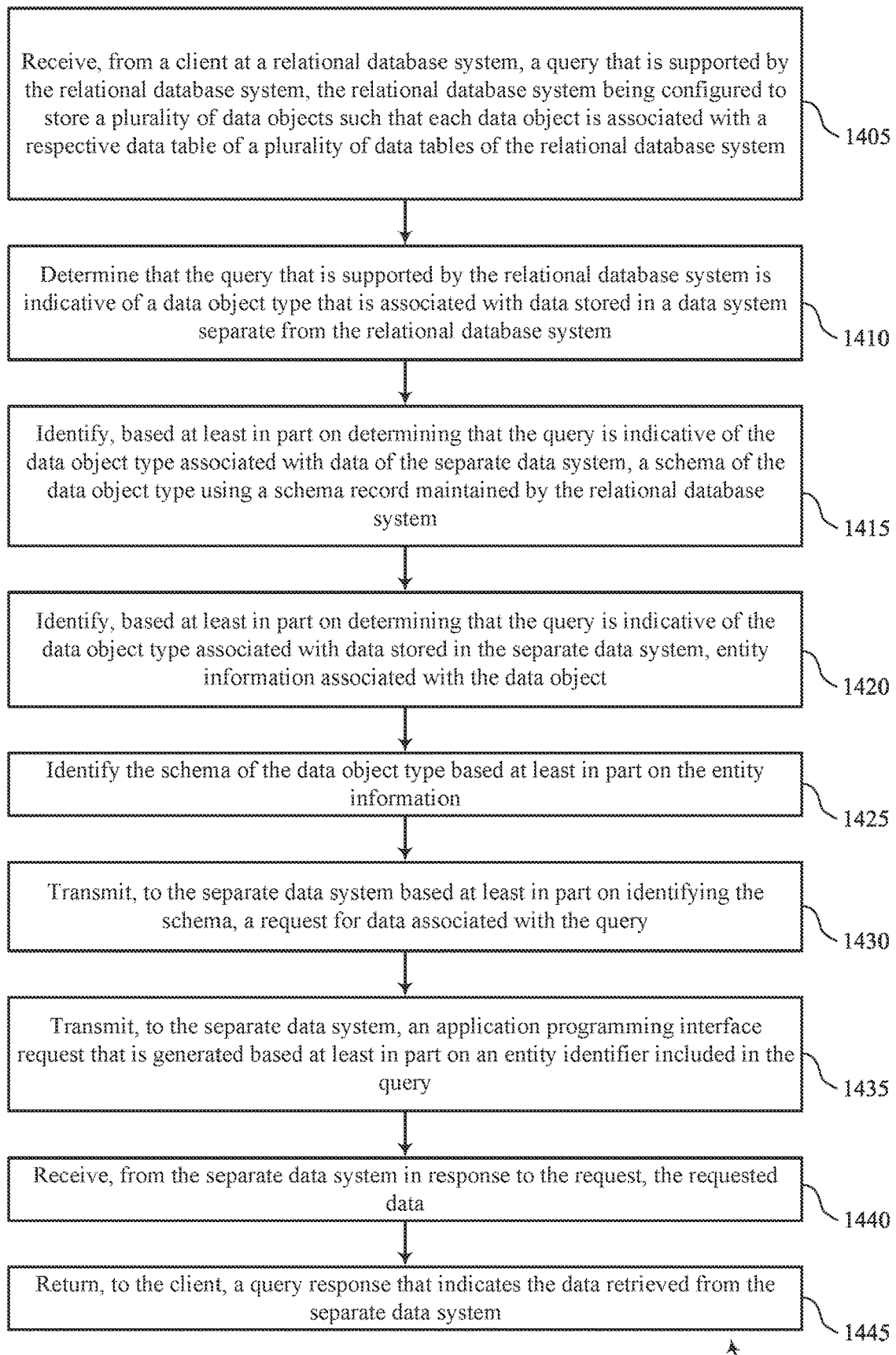

FIG. 14 shows a flowchart illustrating a method 1400 that supports querying for custom data objects in accordance with aspects of the present disclosure. The operations of the method 1400 may be implemented by a Data server or its components as described herein. For example, the operations of the method 1400 may be performed by a Data server as described with reference to FIGs. FIG. 1 through 8. In some examples, a Data server may execute a set of instructions to control the functional elements of the Data server to perform the described functions. Additionally or alternatively, the Data server may perform aspects of the described functions using special-purpose hardware.

At 1405, the method may include receiving, from a client at a relational database system, a query that is supported by the relational database system, the relational database system being configured to store a plurality of data objects such that each data object is associated with a respective data table of a plurality of data tables of the relational database system. The operations of 1405 may be performed in accordance with examples as disclosed herein. In some examples, aspects of the operations of 1405 may be performed by a query interface 725 as described with reference to FIG. 7.

At 1410, the method may include determining that the query that is supported by the relational database system is indicative of a data object type that is associated with data stored in a data system separate from the relational database system. The operations of 1410 may be performed in accordance with examples as disclosed herein. In some examples, aspects of the operations of 1410 may be performed by a query analysis component 730 as described with reference to FIG. 7.

At 1415, the method may include identifying, based at least in part on determining that the query is indicative of the data object type associated with data of the separate data system, a schema of the data object type using a schema record maintained by the relational database system. The operations of 1415 may be performed in accordance with examples as disclosed herein. In some examples, aspects of the operations of 1415 may be performed by a schema identification component 745 as described with reference to FIG. 7.

At 1420, the method may include identifying, based at least in part on determining that the query is indicative of the data object type associated with data stored in the separate data system, entity information associated with the data object. The operations of 1420 may be performed in accordance with examples as disclosed herein. In some examples, aspects of the operations of 1420 may be performed by an entity information component 755 as described with reference to FIG. 7.

At 1425, the method may include identifying the schema of the data object type based at least in part on the entity information. The operations of 1425 may be performed in accordance with examples as disclosed herein. In some examples, aspects of the operations of 1425 may be performed by a schema identification component 745 as described with reference to FIG. 7.

At 1430, the method may include transmitting, to the separate data system based at least in part on identifying the schema, a request for data associated with the query. The operations of 1430 may be performed in accordance with examples as disclosed herein. In some examples, aspects of the operations of 1430 may be performed by a data request component 750 as described with reference to FIG. 7.

At 1435, the method may include transmitting, to the separate data system, an application programming interface request that is generated based at least in part on an entity identifier included in the query. The operations of 1435 may be performed in accordance with examples as disclosed herein. In some examples, aspects of the operations of 1435 may be performed by an API interface 765 as described with reference to FIG. 7.

At 1440, the method may include receiving, from the separate data system in response to the request, the requested data. The operations of 1440 may be performed in accordance with examples as disclosed herein. In some examples, aspects of the operations of 1440 may be performed by a result identification component 735 as described with reference to FIG. 7.

At 1445, the method may include returning, to the client, a query response that indicates the data retrieved from the separate data system. The operations of 1445 may be performed in accordance with examples as disclosed herein. In some examples, aspects of the operations of 1445 may be performed by a result interface 740 as described with reference to FIG. 7.

A method for data processing is described. The method may include receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system, determining that the query is indicative of the data object of the first type, a plurality of data objects of the first type being associated with a same value of the key prefix by the relational database system such that the upper limit is exceeded, identifying, a result of the query based at least in part on determining that the query is indicative of the data object of the first type, and returning, to the client, a query response that indicates the result of the query.

An apparatus for data processing is described. The apparatus may include a processor, memory coupled with the processor, and instructions stored in the memory. The instructions may be executable by the processor to cause the apparatus to receive, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system, determine that the query is indicative of the data object of the first type, a plurality of data objects of the first type being associated with a same value of the key prefix by the relational database system such that the upper limit is exceeded, identify, a result of the query based at least in part on determining that the query is indicative of the data object of the first type, and return, to the client, a query response that indicates the result of the query.

Another apparatus for data processing is described. The apparatus may include means for receiving, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system, means for determining that the query is indicative of the data object of the first type, a plurality of data objects of the first type being associated with a same value of the key prefix by the relational database system such that the upper limit is exceeded, means for identifying, a result of the query based at least in part on determining that the query is indicative of the data object of the first type, and means for returning, to the client, a query response that indicates the result of the query.

A non-transitory computer-readable medium storing code for data processing is described. The code may include instructions executable by a processor to receive, from a client at a relational database system, a query for a data object of a first type, the relational database system being configured to store a plurality of data objects of a second type such that each data object of the second type is associated with a respective data table of a plurality of data tables supported by the relational database system and a respective value of a key prefix of an object identifier field, the key prefix resulting in an upper limit of data objects supportable by the relational database system, determine that the query is indicative of the data object of the first type, a plurality of data objects of the first type being associated with a same value of the key prefix by the relational database system such that the upper limit is exceeded, identify, a result of the query based at least in part on determining that the query is indicative of the data object of the first type, and return, to the client, a query response that indicates the result of the query.

Some examples of the method, apparatuses, and non-transitory computer-readable medium described herein may further include operations, features, means, or instructions for determining, based at least in part on determining that the query may be indicative of the data object of the first type, that the data object may be stored in a separate data system from the relational database system, wherein identifying the result of the query includes retrieving the result from the separate data system.

In some examples of the method, apparatuses, and non-transitory computer-readable medium described herein, identifying the result of the query may include operations, features, means, or instructions for transmitting, to the separate data system, an application programming interface request that may be generated based at least in part on an entity identifier included in the query.

Some examples of the method, apparatuses, and non-transitory computer-readable medium described herein may further include operations, features, means, or instructions for identifying, based at least in part on determining that the query may be indicative of the data object of the first type, entity information corresponding to the data object, wherein each of the plurality of data objects of the first type may be associated with the same value of the key prefix but different entity information and wherein each of the plurality of data objects of the second type may be associated with a different key prefix value that corresponds to respective entity information and identifying the result of the query based at least in part on the identified entity information for the data object.

Some examples of the method, apparatuses, and non-transitory computer-readable medium described herein may further include operations, features, means, or instructions for receiving, at the relational database system, a request to create the data object of the first type, wherein the request includes an entity name corresponding to the data object and causing a data table corresponding to the data object to be generated at a separate data system from the relational database system, each data object of the first type associated with a respective data table in the separate data system.

Some examples of the method, apparatuses, and non-transitory computer-readable medium described herein may further include operations, features, means, or instructions for associating the same value of the key prefix with the data object such data tables at the separate data system may be configured to use the same value of the key prefix for the plurality of data objects of the first type, wherein the data object may be identifiable from the separate data system based at least in part on the entity name corresponding to the data object.

In some examples of the method, apparatuses, and non-transitory computer-readable medium described herein, determining that the query may be indicative of the data object of the first type may include operations, features, means, or instructions for identifying that the query includes an object suffix that indicates that the data object may be of the first type.

A method for data processing is described. The method may include receiving, from a client at a relational database system, a query that is supported by the relational database system, the relational database system being configured to store a plurality of data objects such that each data object is associated with a respective data table of a plurality of data tables of the relational database system, determining that the query that is supported by the relational database system is indicative of a data object type that is associated with data stored in a data system separate from the relational database system, identifying, based at least in part on determining that the query is indicative of the data object type associated with data of the separate data system, a schema of the data object type using a schema record maintained by the relational database system, transmitting, to the separate data system based at least in part on identifying the schema, a request for data associated with the query, receiving, from the separate data system in response to the request, the requested data, and returning, to the client, a query response that indicates the data retrieved from the separate data system.

An apparatus for data processing is described. The apparatus may include a processor, memory coupled with the processor, and instructions stored in the memory. The instructions may be executable by the processor to cause the apparatus to receive, from a client at a relational database system, a query that is supported by the relational database system, the relational database system being configured to store a plurality of data objects such that each data object is associated with a respective data table of a plurality of data tables of the relational database system, determine that the query that is supported by the relational database system is indicative of a data object type that is associated with data stored in a data system separate from the relational database system, identify, based at least in part on determining that the query is indicative of the data object type associated with data of the separate data system, a schema of the data object type using a schema record maintained by the relational database system, transmit, to the separate data system based at least in part on identifying the schema, a request for data associated with the query, receive, from the separate data system in response to the request, the requested data, and return, to the client, a query response that indicates the data retrieved from the separate data system.

Another apparatus for data processing is described. The apparatus may include means for receiving, from a client at a relational database system, a query that is supported by the relational database system, the relational database system being configured to store a plurality of data objects such that each data object is associated with a respective data table of a plurality of data tables of the relational database system, means for determining that the query that is supported by the relational database system is indicative of a data object type that is associated with data stored in a data system separate from the relational database system, means for identifying, based at least in part on determining that the query is indicative of the data object type associated with data of the separate data system, a schema of the data object type using a schema record maintained by the relational database system, means for transmitting, to the separate data system based at least in part on identifying the schema, a request for data associated with the query, means for receiving, from the separate data system in response to the request, the requested data, and means for returning, to the client, a query response that indicates the data retrieved from the separate data system.

A non-transitory computer-readable medium storing code for data processing is described. The code may include instructions executable by a processor to receive, from a client at a relational database system, a query that is supported by the relational database system, the relational database system being configured to store a plurality of data objects such that each data object is associated with a respective data table of a plurality of data tables of the relational database system, determine that the query that is supported by the relational database system is indicative of a data object type that is associated with data stored in a data system separate from the relational database system, identify, based at least in part on determining that the query is indicative of the data object type associated with data of the separate data system, a schema of the data object type using a schema record maintained by the relational database system, transmit, to the separate data system based at least in part on identifying the schema, a request for data associated with the query, receive, from the separate data system in response to the request, the requested data, and return, to the client, a query response that indicates the data retrieved from the separate data system.

Some examples of the method, apparatuses, and non-transitory computer-readable medium described herein may further include operations, features, means, or instructions for receiving, at the relational database system, a request to create the data object of the data object type, generating the schema of the data object type based at least in part on receiving the request, and transmitting, to the separate data system, an indication of the schema such that the separate data system may be configured to ingest data corresponding to the data object type.

In some examples of the method, apparatuses, and non-transitory computer-readable medium described herein, generating the schema may include operations, features, means, or instructions for receiving an indication of one or more columns to adjust for ingesting data corresponding to the data object type and generating a data stream process based at least in part on receiving the indication, wherein the data stream process may be configured to execute at the separate data system for ingesting data of the data object type.

In some examples of the method, apparatuses, and non-transitory computer-readable medium described herein, transmitting the request for the data may include operations, features, means, or instructions for transmitting, to the separate data system, an application programming interface request that may be generated based at least in part on an entity identifier included in the query.

Some examples of the method, apparatuses, and non-transitory computer-readable medium described herein may further include operations, features, means, or instructions for identifying, based at least in part on the query, a tenant of a plurality of tenants supported by the relational database system and identifying a token that may be associated with the identified tenant to be used for authenticating the request to the separate data system, wherein the token may be transmitted with the request such that the request may be authenticated.

Some examples of the method, apparatuses, and non-transitory computer-readable medium described herein may further include operations, features, means, or instructions for identifying, based at least in part on determining that the query may be indicative of the data object type associated with data stored in the separate data system, entity information associated with the data object and identifying the schema of the data object type based at least in part on the entity information.

In some examples of the method, apparatuses, and non-transitory computer-readable medium described herein, determining that the query may be indicative of the data object type may include operations, features, means, or instructions for identifying that the query includes an object suffix that indicates that the data object may be of the data object type that may be associated with the data stored in the separate data system.

In some examples of the method, apparatuses, and non-transitory computer-readable medium described herein, the separate data system may be a non-relational database system.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

receiving, at a relational database system, an indication of a definition of a data object type and an indication of a data stream process for ingesting data associated with the data object type;

receiving, from a client at the relational database system, a query that is supported by the relational database system, the relational database system being configured to store a plurality of data objects such that each data object is associated with a respective data table of a plurality of data tables of the relational database system and a respective value of a key prefix, the key prefix resulting in an upper limit of data objects supportable by the relational database system;

determining that the query that is supported by the relational database system is indicative of the data object type that is associated with data stored in a data system separate from the relational database system, wherein the separate data system is a non-relational database system;

identifying, based at least in part on determining that the query is indicative of the data object type associated with the data stored in the separate data system, a schema of the data object type using a schema record maintained by the relational database system and the separate data system, wherein the schema indicates mapping information maintained in the relational database system and indicates information that is configured to differentiate between data objects stored in the separate data system and sharing a same value of the key prefix;

transmitting, to the separate data system based at least in part on identifying the schema, a request associated with a data object, wherein the request is configured based at least in part on the identified schema;

receiving, from the separate data system in response to the request, the requested data that is ingested based at least in part on the separate data system being the non-relational database system and using the data stream process; and returning, to the client, a query response that indicates the data retrieved from the separate data system.

2. The method of claim 1, further comprising:

receiving, at the relational database system, a request to create the data object of the data object type;

generating the schema of the data object type based at least in part on receiving the request; and transmitting, to the separate data system, an indication of the schema such that the separate data system is configured to ingest the data corresponding to the data object type.

3. The method of claim 2, wherein generating the schema comprises:
   receiving an indication of one or more columns to adjust for ingesting the data corresponding to the data object type; and
   generating the data stream process based at least in part on receiving the indication, wherein the data stream process is configured to execute at the separate data system for ingesting the data of the data object type.

4. The method of claim 1, wherein transmitting the request for the data comprises:
   transmitting, to the separate data system, an application programming interface request that is generated based at least in part on an entity identifier included in the query.

5. The method of claim 1, further comprising:
   identifying, based at least in part on the query, a tenant of a plurality of tenants supported by the relational database system; and
   identifying a token that is associated with the identified tenant is to be used for authenticating the request to the separate data system, wherein the token is transmitted with the request such that the request is authenticated.

6. The method of claim 1, further comprising:
   identifying, based at least in part on determining that the query is indicative of the data object type associated with the data stored in the separate data system, entity information associated with the data object; and
   identifying the schema of the data object type based at least in part on the entity information.

7. The method of claim 1, wherein determining that the query is indicative of the data object type comprises:
   identifying that the query includes an object suffix that indicates that the data object is of the data object type that is associated with the data stored in the separate data system.

8. The method of claim 1, wherein the indication of the definition of the data object type and the indication of the data stream process identify a set of data translation parameters for ingesting the requested data based at least in part on the separate data system being the non-relational database system.

9. The method of claim 1, wherein the indication of the data stream process includes a data stream definition indicating a schema for ingesting the data, a schema concatenation to applied during ingestion, scheduling information, data location information for ingesting the data, or a combination thereof.

10. An apparatus for data processing, comprising:
    one or more processors;
    one or more memories coupled with the one or more processors; and
    instructions stored in the one or more memories and executable by the one or more processors to cause the apparatus to:
    receive, at a relational database system, an indication of a definition of a data object type and an indication of a data stream process for ingesting data associated with the data object type;
    receive, from a client at the relational database system, a query that is supported by the relational database system, the relational database system being configured to store a plurality of data objects such that each data object is associated with a respective data table of a plurality of data tables of the relational database system and a respective value of a key prefix, the key prefix resulting in an upper limit of data objects supportable by the relational database system;
    determine that the query that is supported by the relational database system is indicative of the data object type that is associated with data stored in a data system separate from the relational database system, wherein the separate data system is a non-relational database system;
    identify, based at least in part on determining that the query is indicative of the data object type associated with the data stored in the separate data system, a schema of the data object type using a schema record maintained by the relational database system and the separate data system, wherein the schema indicates mapping information maintained in the relational database system and indicates information that is configured to differentiate between data objects stored in the separate data system and sharing a same value of the key prefix;
    transmit, to the separate data system based at least in part on identifying the schema, a request associated with a data object, wherein the request is configured based at least in part on the identified schema;
    receive, from the separate data system in response to the request, the requested data that is ingested based at least in part on the separate data system being the non-relational database system and using the data stream process; and
    return, to the client, a query response that indicates the data retrieved from the separate data system.

11. The apparatus of claim 10, wherein the instructions are further executable by the one or more processors to cause the apparatus to:
    receive, at the relational database system, a request to create the data object of the data object type;
    generate the schema of the data object type based at least in part on receiving the request; and
    transmit, to the separate data system, an indication of the schema such that the separate data system is configured to ingest the data corresponding to the data object type.

12. The apparatus of claim 11, wherein the instructions to generate the schema are executable by the one or more processors to cause the apparatus to:
    receive an indication of one or more columns to adjust for ingesting the data corresponding to the data object type; and
    generate the data stream process based at least in part on receiving the indication, wherein the data stream process is configured to execute at the separate data system for ingesting the data of the data object type.

13. The apparatus of claim 10, wherein the instructions to transmit the request for the data are executable by the one or more processors to cause the apparatus to:
    transmit, to the separate data system, an application programming interface request that is generated based at least in part on an entity identifier included in the query.

14. The apparatus of claim 10, wherein the instructions are further executable by the one or more processors to cause the apparatus to:
    identify, based at least in part on the query, a tenant of a plurality of tenants supported by the relational database system; and
    identify a token that is associated with the identified tenant is to be used for authenticating the request to the separate data system, wherein the token is transmitted with the request such that the request is authenticated.

15. The apparatus of claim 10, wherein the instructions are further executable by the one or more processors to cause the apparatus to:
- identify, based at least in part on determining that the query is indicative of the data object type associated with the data stored in the separate data system, entity information associated with the data object; and
- identify the schema of the data object type based at least in part on the entity information.

16. A non-transitory computer-readable medium storing code for data processing, the code comprising instructions executable by one or more processors to:
- receive, at a relational database system, an indication of a definition of a data object type and an indication of a data stream process for ingesting data associated with the data object type;
- receive, from a client at the relational database system, a query that is supported by the relational database system, the relational database system being configured to store a plurality of data objects such that each data object is associated with a respective data table of a plurality of data tables of the relational database system and a respective value of a key prefix, the key prefix resulting in an upper limit of data objects supportable by the relational database system;
- determine that the query that is supported by the relational database system is indicative of the data object type that is associated with data stored in a data system separate from the relational database system, wherein the separate data system is a non-relational database system;
- identify, based at least in part on determining that the query is indicative of the data object type associated with the data stored in the separate data system, a schema of the data object type using a schema record maintained by the relational database system and the separate data system, wherein the schema indicates mapping information maintained in the relational database system and indicates information that is configured to differentiate between data objects stored in the separate data system and sharing a same value of the key prefix;
- transmit, to the separate data system based at least in part on identifying the schema, a request associated with a data object, wherein the request is configured based at least in part on the identified schema;
- receive, from the separate data system in response to the request, the requested data that is ingested based at least in part on the separate data system being the non-relational database system and using the data stream process; and
- return, to the client, a query response that indicates the data retrieved from the separate data system.

17. The non-transitory computer-readable medium of claim 16, wherein the instructions are further executable by the one or more processors to:
- receive, at the relational database system, a request to create the data object of the data object type;
- generate the schema of the data object type based at least in part on receiving the request; and
- transmit, to the separate data system, an indication of the schema such that the separate data system is configured to ingest the data corresponding to the data object type.

18. The non-transitory computer-readable medium of claim 17, wherein the instructions to generate the schema are executable by the processor one or more processors to:
- receive an indication of one or more columns to adjust for ingesting the data corresponding to the data object type; and
- generate the data stream process based at least in part on receiving the indication, wherein the data stream process is configured to execute at the separate data system for ingesting the data of the data object type.

19. The non-transitory computer-readable medium of claim 16, wherein the instructions to transmit the request for the data are executable by the one or more processors to:
- transmit, to the separate data system, an application programming interface request that is generated based at least in part on an entity identifier included in the query.

20. The non-transitory computer-readable medium of claim 16, wherein the instructions are further executable by the one or more processors to:
- identify, based at least in part on the query, a tenant of a plurality of tenants supported by the relational database system; and
- identify a token that is associated with the identified tenant is to be used for authenticating the request to the separate data system, wherein the token is transmitted with the request such that the request is authenticated.

* * * * *